US011525261B2

(12) United States Patent
Neal

(10) Patent No.: US 11,525,261 B2
(45) Date of Patent: Dec. 13, 2022

(54) SUSPENDED CEILING CONNECTORS FOR UNIQUE GRID DESIGNS

(71) Applicant: Worthington Armstrong Venture, Malvern, PA (US)

(72) Inventor: Joshua L. Neal, Phoenixville, PA (US)

(73) Assignee: Worthington Armstrong Venture, Malvern, PA (US)

( * ) Notice: Subject to any disclaimer, the term of this patent is extended or adjusted under 35 U.S.C. 154(b) by 938 days.

(21) Appl. No.: 16/359,030

(22) Filed: Mar. 20, 2019

(65) Prior Publication Data
US 2019/0292781 A1 Sep. 26, 2019

Related U.S. Application Data

(60) Provisional application No. 62/645,838, filed on Mar. 21, 2018.

(51) Int. Cl.
*E04B 9/12* (2006.01)
*F16M 13/02* (2006.01)
(Continued)

(52) U.S. Cl.
CPC .............. *E04B 9/12* (2013.01); *E04B 1/40* (2013.01); *E04B 9/127* (2013.01); *E04B 9/14* (2013.01);
(Continued)

(58) Field of Classification Search
CPC .......... E04B 1/40; E04B 1/34326; E04B 9/12; E04B 9/127; E04B 9/14; E04B 9/18; E04B 9/345; E04B 2001/405; F16M 13/027
See application file for complete search history.

(56) References Cited

U.S. PATENT DOCUMENTS 2,990,921 A * 7/1961 Wilde ............... E04B 9/127
52/506.07
3,590,546 A * 7/1971 Lambert ............ E04B 9/14
454/301
(Continued)

FOREIGN PATENT DOCUMENTS

CA 2310751 C * 10/2008 ............ E04B 9/006
CA 2798897 A1 * 6/2013 ............ E04B 9/006
(Continued)

OTHER PUBLICATIONS

International Search Report for International Application No. PCT/US2019/023313 dated Jul. 1, 2019.

*Primary Examiner* — Jessie T Fonseca
(74) *Attorney, Agent, or Firm* — Stradley Ronon Stevens & Young, LLP

(57) ABSTRACT

A ceiling beam connector that permits the incorporation of ornamental panel designs such as triangles, parallelograms, and trapezoids into suspended ceilings. The connector has a faceplate attached to either two arms or a leg. The leg is attached to either the faceplate or an arm at an acute angle measured from an axis perpendicular to the faceplate. To maintain standard beam lengths and rout spacing at 2 foot, 3 foot, or 4 foot (61 cm, 91 cm, or 122 cm) beam spacing, the leg may project out at the following angles measured from the axis: about 14.0°, about 18.4°, about 26.6°, about 30.3°, about 45.0°, about 59.7°, about 63.4°, about 71.6°, or about 76.0°.

20 Claims, 20 Drawing Sheets

(51) Int. Cl.
*E04B 1/41* (2006.01)
*E04B 9/18* (2006.01)
*E04B 9/14* (2006.01)
E04B 1/38 (2006.01)
E04B 1/343 (2006.01)
E04B 9/34 (2006.01)

(52) U.S. Cl.
CPC .............. *E04B 9/18* (2013.01); *F16M 13/027* (2013.01); *E04B 1/34326* (2013.01); *E04B 9/345* (2013.01); *E04B 2001/405* (2013.01)

(56) References Cited

U.S. PATENT DOCUMENTS

| | | | | |
|---|---|---|---|---|
| 3,798,865 | A * | 3/1974 | Curtis | E04B 9/127 52/715 |
| 5,839,246 | A * | 11/1998 | Ziegler | E04B 9/068 52/506.07 |
| 6,138,425 | A * | 10/2000 | Wendt | E04B 9/127 52/712 |
| 6,178,712 | B1 * | 1/2001 | Sauer | E04B 9/122 52/506.07 |
| 6,523,313 | B2 * | 2/2003 | Lin | E04B 9/10 52/506.08 |
| 7,293,393 | B2 * | 11/2007 | Kelly | E04B 9/067 52/506.07 |
| D638,289 | S * | 5/2011 | Tedesco | D8/394 |
| 8,117,793 | B2 * | 2/2012 | Jankovec | E04B 9/122 52/506.07 |
| 10,036,163 | B1 * | 7/2018 | Paulsen | E04B 9/30 |
| 10,676,925 | B2 * | 6/2020 | Baxter | E04B 9/12 |
| 2007/0180787 | A1 * | 8/2007 | Fecska | E04B 9/127 52/506.06 |
| 2012/0017531 | A1 * | 1/2012 | Bankston | E04B 9/127 52/506.05 |
| 2012/0186175 | A1 * | 7/2012 | Gerkes | E04B 9/14 52/506.05 |
| 2013/0105641 | A1 * | 5/2013 | Feenstra | E04B 9/18 248/75 |
| 2014/0000205 | A1 * | 1/2014 | Underkofler | E04B 9/127 52/698 |
| 2014/0037366 | A1 * | 2/2014 | Groza | E04B 9/14 403/171 |
| 2016/0040426 | A1 * | 2/2016 | Sareyka | E04B 9/122 52/506.05 |
| 2019/0360203 | A1 * | 11/2019 | Harnish | E04B 9/14 |

FOREIGN PATENT DOCUMENTS

| | | | | |
|---|---|---|---|---|
| CN | 103835426 | A * | 6/2014 | ............ E04B 9/068 |
| CN | 109690175 | A * | 4/2019 | ............ E04B 9/006 |
| CN | 111005456 | A * | 4/2020 | ............... E04B 1/38 |
| DE | 2330820 | | 1/1975 | |
| EP | 0645505 | | 3/1995 | |
| KR | 20170075870 | A * | 7/2017 | |
| WO | WO-9631667 | A1 * | 10/1996 | .......... E04B 1/2403 |
| WO | WO-2018045427 | A1 * | 3/2018 | ............... E04B 9/14 |
| WO | WO-2019211751 | A1 * | 11/2019 | ............ E04B 9/068 |

* cited by examiner

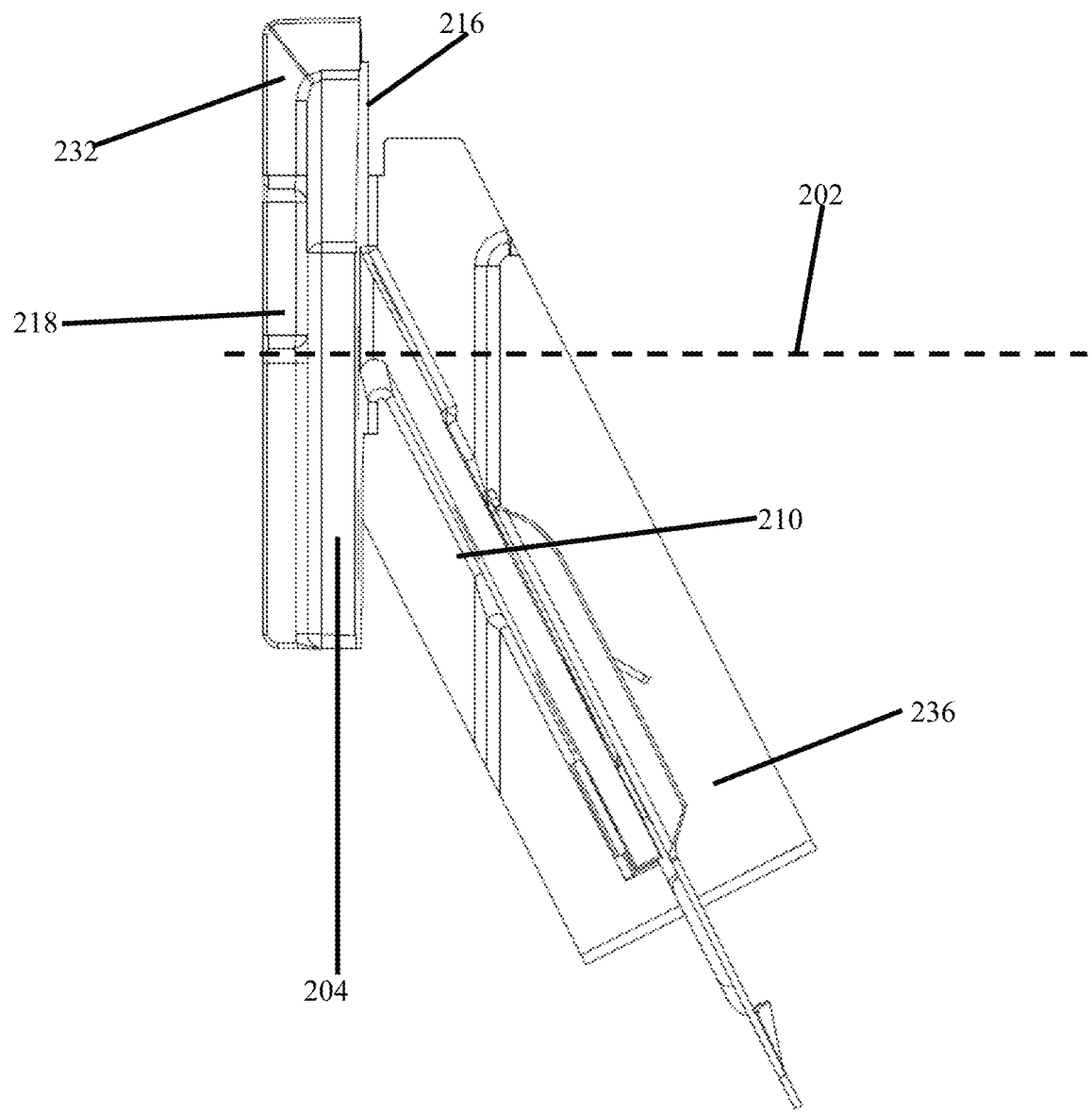
FIG. 2B
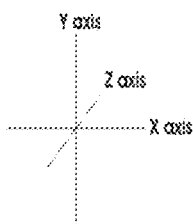

SUSPENDED CEILING CONNECTORS FOR UNIQUE GRID DESIGNS

RELATED APPLICATION

This application claims the benefit of priority to U.S. Provisional Application No. 62/645,838 filed on Mar. 21, 2018. This application incorporates by reference into this document all prior applications in their entirety and for all purposes.

TECHNICAL FIELD

The present invention relates generally to suspended ceiling systems, and more particularly to suspended ceiling beam connectors that allow for the design of unique grids that are not restricted to squares and rectangles and may instead incorporate additional flexible shapes such as triangles, parallelograms, and trapezoids.

BACKGROUND OF THE INVENTION

Suspended ceilings in rooms are common. Suspended ceilings having metal beams or runners that form square or rectangular grids to support square or rectangular panels are known. Such grids have main beams and intersecting cross beams. The beams are formed generally of flat sheet metal folded into an inverted T cross section having a web, a bulb at the top of the web, and a horizontal flange extending in both directions from the bottom of the web. The web is formed of two adjacent layers typically stitched together by punching a portion of one layer through a portion of the second layer surface creating an indentation in the first layer and a bump in the second layer surface. In some instances, the beams are not folded metal but instead are made of extruded metal, such as aluminum. The main beams are secured end-to-end by connectors. The main beams are suspended from the structure ceiling by wires.

The main beams, which run parallel to one another, are generally spaced 24 inches, 36 inches, or 48 inches (61 cm, 91 cm, or 122 cm) apart. A straight, finished main beam may continuously emerge from a roll-forming operation, and then be cut, on the run, into suitable lengths of, for instance, 12 feet (366 cm). The main beams may then be joined together to form a desired length with splice plates, such as those disclosed in U.S. Pat. No. 6,305,139.

Crossbeams are connected to the main beams through slots in the main beams. Such connections form corners. In such a configuration, the cross beams are typically supported by the main beams. Cross beams are manufactured in a manner similar to main beams and may be cut into lengths of 2, 3, or 4 feet (61 cm, 91 cm, or 122 cm). When cross beams are connected to main beams, they form either square (e.g., 24 inches×24 inches or 61 cm×61 cm) or rectangular openings (e.g., 24 inches×48 inches or 61 cm×122 cm), which receive laid-in panels.

As a simple glance skyward in most office buildings will confirm, there is only so much that can be done with squares and rectangles. To create truly beautiful ceilings an installer needs more ornamental panel designs. As a result, there is an immediate need for connectors that may be incorporated into a suspended ceiling grid to form a flexible grid design to support panels having more ornamental designs such as triangles, parallelograms, or trapezoids.

BRIEF SUMMARY OF THE INVENTION

To incorporate such ornamental panels and create beautiful suspended ceilings, a ceiling system with angled connectors and corner connectors is disclosed.

The angle connector has a U-shaped body, defining a channel. The body includes a faceplate, containing a plate aperture. The faceplate connects a first arm and a second arm to form the channel. A protuberance projects outward from an interior surface of the first arm. A leg is attached to the first arm at an edge opposite the faceplate. The leg projects outward at an acute angle from an axis substantially perpendicular to the interior surface of the faceplate. In one embodiment, to align with the locations of industry standard slots 312 on beams 300, the angle may be about 14.0 degrees, about 18.4 degrees, about 26.6 degrees, about 30.3 degrees, about 45.0 degrees, about 59.7 degrees, about 63.4 degrees, about 71.6 degrees, or about 76.0 degrees. In another non-limiting embodiment, to align with beams 300 having locations of custom slots 312, the angles may be about 15.0 degrees, about 30.0 degrees, about 45.0 degrees, about 60.0 degrees, or about 75.0 degrees. The leg also has at least one leg aperture and a terminal end opposite the first arm. The angle connector also has a flange which begins at the faceplate and extends substantially perpendicularly out, in both directions, from the first arm, the second arm, and the leg.

The angle connector may have a second leg attached to the second arm at an edge opposite the faceplate. The second leg projects outward at an acute angle from the axis, and has at least one leg aperture and a terminal end opposite the first arm. Again, to align with locations on industry standard slots 312 on main beams 300, the angle may be about 14.0 degrees, about 18.4 degrees, about 26.6 degrees, about 30.3 degrees, about 45.0 degrees, about 59.7 degrees, about 63.4 degrees, about 71.6 degrees, or about 76.0 degrees. In another non-limiting embodiment, to align with main beams 300 having custom route (i.e., slot 312) locations, the angles may be about 15.0 degrees, about 30.0 degrees, about 45.0 degrees, about 60.0 degrees, or about 75.0 degrees.

The angle connector may have a second protuberance located opposite the first protuberance and projecting outward from an interior surface of the second arm. The protuberances may restrict movement of a fastener component along an axis perpendicular to the faceplate. In addition, the protuberances may project outward from the interior surface of the first arm or the second arm by a variable distance. The protuberances may also contact the faceplate creating a landing with at least one substantially flat surface for aligning a fastener component dropped into the channel with the plate aperture.

The angle connector may have a spacing protuberance projecting outward from the exterior surface of the faceplate. Such a spacing protuberance may take on many shapes such as triangles, rectangles, squares, rhombus, L-shapes, V-shapes, H-shapes, circles, or a combination thereof.

The angle connector may also have a locating protuberance projecting outward from the exterior surface of the faceplate. The locating protuberance may contact the spacing protuberance. The angle connector may have two or more locating protuberances which may be vertically offset.

The corner connector includes a faceplate, containing a plate aperture. A leg is attached to the faceplate and projects outward at an acute angle from an axis substantially perpendicular to the surface of the faceplate connected to the leg. The angle may be about 14.0 degrees, about 18.4 degrees, about 26.6 degrees, about 30.3 degrees, about 45.0 degrees, about 59.7 degrees, about 63.4 degrees, about 71.6 degrees, or about 76.0 degrees. The leg has at least one leg aperture and a terminal end opposite the faceplate. The corner connector includes a spacing protuberance projecting outward from the surface of the faceplate opposite the leg, which wraps around at least one edge of the faceplate. Finally, the corner connector includes a flange, commencing at the faceplate and extending substantially perpendicularly out, in both directions, from the leg.

In both the angle connector and the corner connector, there may be three or more leg apertures. Two leg apertures may be vertically aligned close to the terminal end and a third aperture, forming a triangle with the first two apertures, may be further from the terminal end than the first two apertures.

The flange of both the angle connector and the corner connector may include a step and may also extend past the terminal end of the legs.

Finally, a suspended ceiling grid which may support ornamental panel designs such as triangles, parallelograms, and trapezoids may be constructed by attaching beams to the corner connectors and/or angle connectors.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 2B is a top view of the corner connector shown in FIG. 2A;

DETAILED DESCRIPTION OF THE INVENTION

Figure 1A:
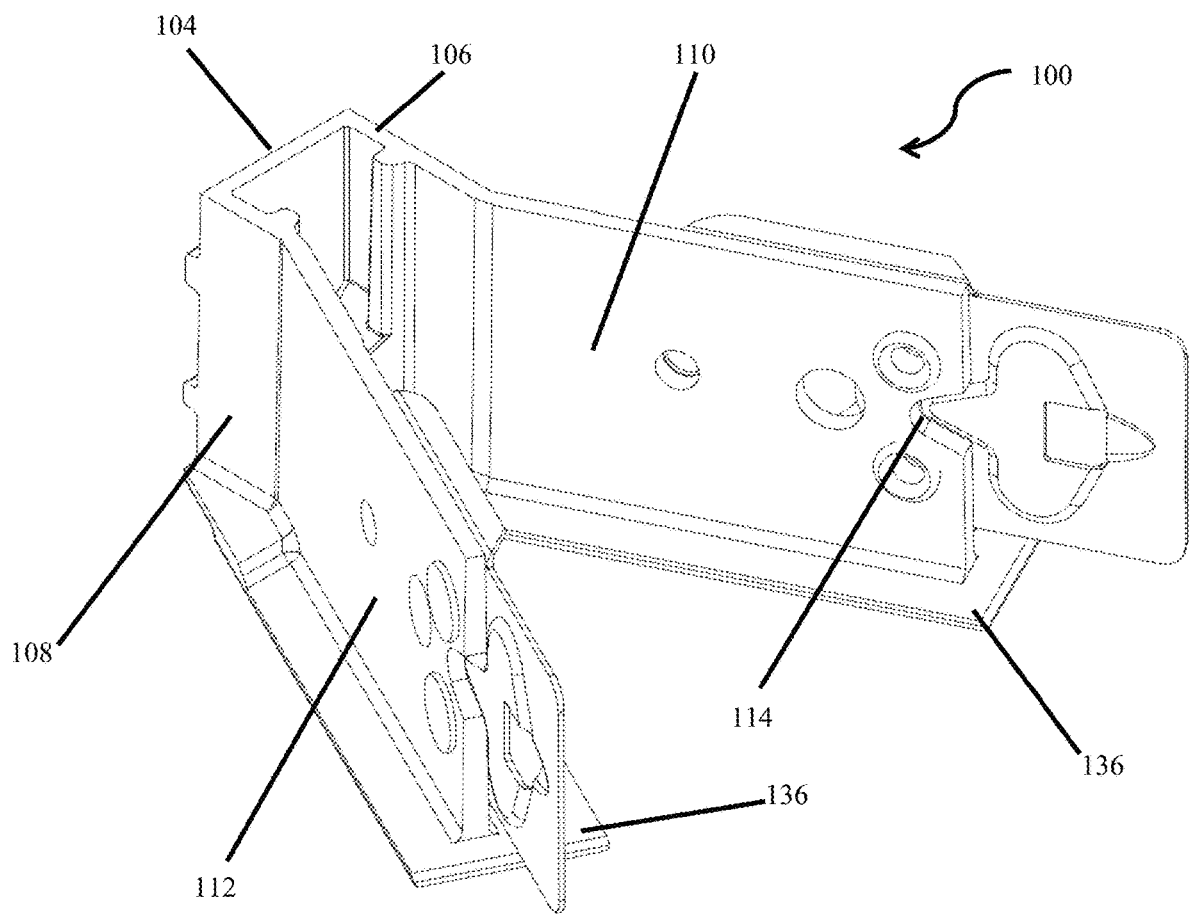
FIG. 1A is a perspective view of one embodiment of an angle connector.

The features and benefits of the disclosed connectors and ceiling system are illustrated and described by reference to exemplary embodiments. The disclosure also includes the drawing, in which like reference numbers refer to like elements throughout the various figures that comprise the drawing. This description of exemplary embodiments is intended to be read in connection with the accompanying drawing, which is to be considered part of the entire written description. Accordingly, the disclosure expressly should not be limited to such exemplary embodiments illustrating some possible non-limiting combinations of features that may exist alone or in other combinations of features.

In the description of embodiments, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives of those terms (e.g., "horizontally," "downwardly," "upwardly," etc.) should be construed to refer to the orientation as then described or as shown in the drawing under discussion. These relative terms are for convenience of description only and do not require that the apparatus be construed or operated in a particular orientation. Terms such as "attached," "affixed," "connected," "coupled," "interconnected," and similar terms refer to a relationship wherein structures are secured or attached to one another either directly or indirectly through intervening structures, as well as both moveable or rigid attachments or relationships, unless expressly described otherwise.

FIG. 1A depicts an exemplary embodiment of an angled connector 100 according to the present disclosure. The connector includes an angle faceplate 104 which may be disposed upon an axis 102 aligned in the y direction of a conventional Cartesian x-y-z coordinate system. A Cartesian coordinate system (X, Y, Z) is a coordinate system that specifies each point uniquely in three-dimensional space by three Cartesian numerical coordinates, which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0). The coordinates can also be defined as the positions of the perpendicular projections of the point onto the three axes, expressed as signed distances from the origin.

In a non-limiting embodiment, the angle connector 100 includes: (1) the angle faceplate 104 connecting a first arm 106 and a second arm 108 creating a channel 124; (2) a first leg 110 attached to the first arm 106 at the edge of the first arm 106 opposite the angle faceplate 104; and (3) a flange 136 that commences at the angle faceplate 104 and extends substantially perpendicularly out in both directions from the first arm 106 and the first leg 110. In a non-limiting embodiment, the flange 136 may extend past the terminal end 138 of the first leg 110.

In another embodiment, the angle connector 100 further includes a second leg 112 attached to the second arm 108 at the edge of the second arm 108 opposite the angle faceplate 104. The flange 136 may also commence at the angle faceplate 104 and extend substantially perpendicularly out in both directions from the second arm 108 and the second leg 112. The flange 136 may be a solid surface, C-shaped, or V-shaped. The flange 136 may further extend past the terminal end 138 of the second leg 112. In one non-limiting embodiment, the flange 136 is about 9/16 inches (1.4 cm) wide. In another embodiment, the flange 136 is about 15/16 inches (2.4 cm) wide.

Figure 2A:
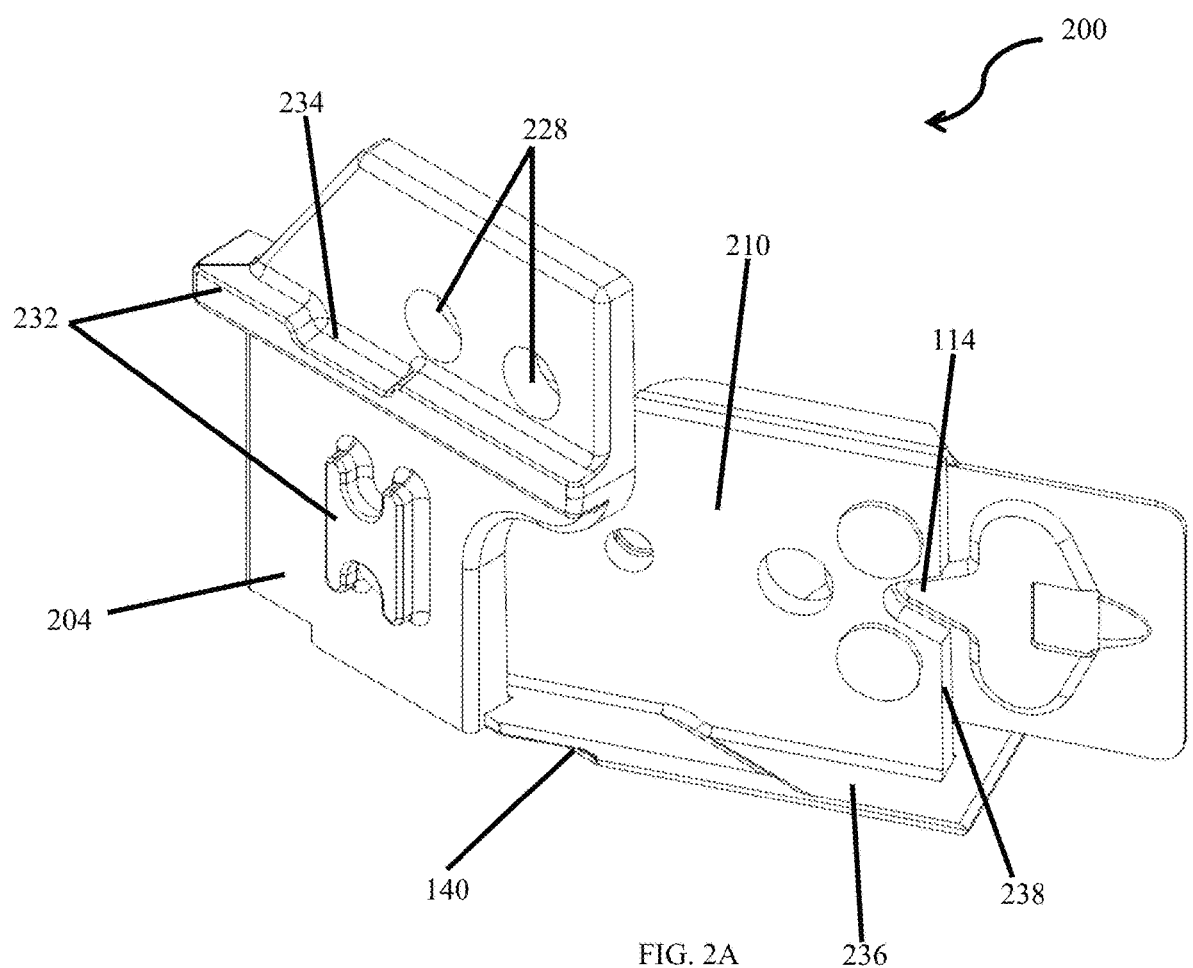
FIG. 2A is a perspective view of one embodiment of a corner connector.
Figure 2C:
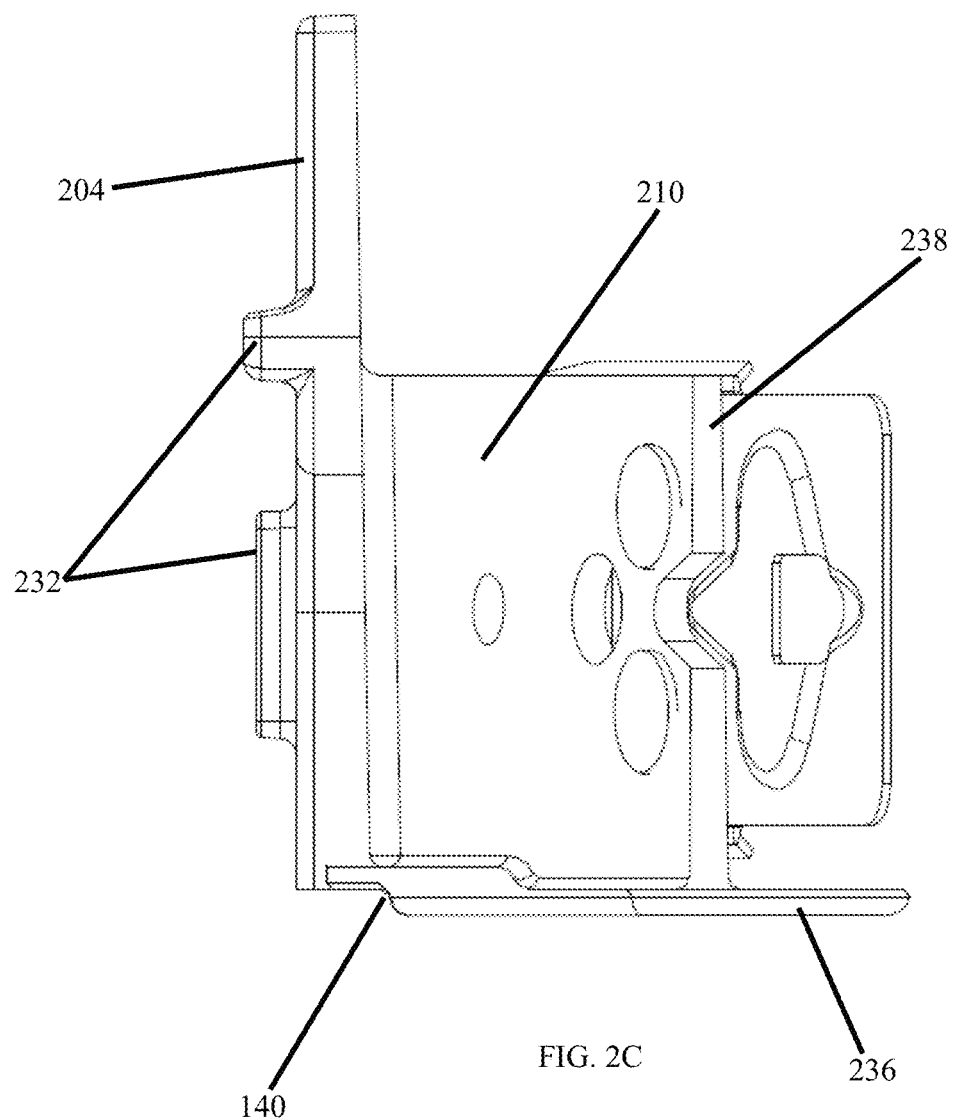
FIG. 2C is a side view of the corner connector shown in FIGS. 2A and 2B.
Figure 2D:
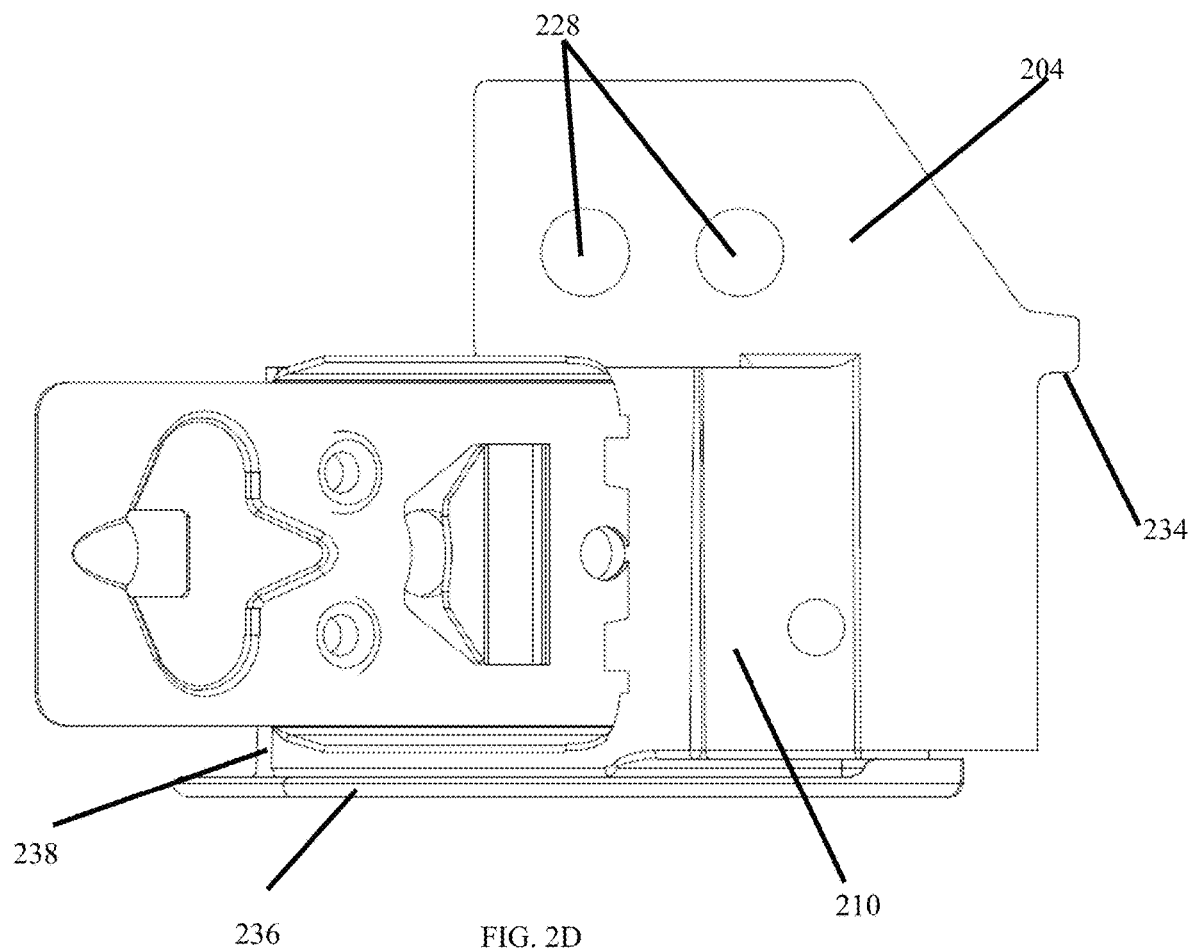
FIG. 2D is a rear view of the corner connector shown in FIGS. 2A, 2B, and 2C.
Figure 2E:
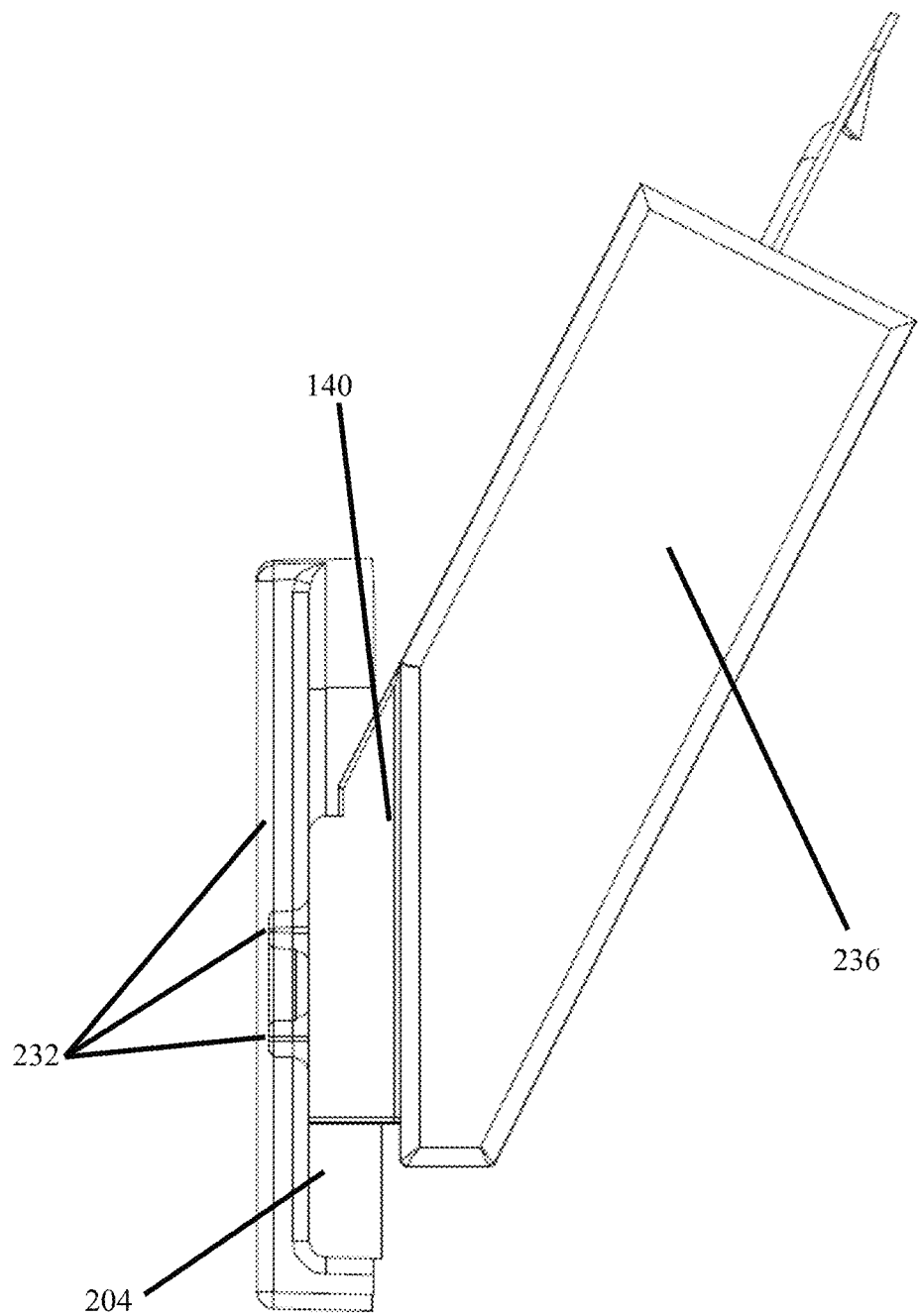
FIG. 2E is a bottom view of the corner connector shown in FIGS. 2A, 2B, 2C, and 2D.

FIG. 2A depicts an exemplary embodiment of a corner connector 200 according to the present disclosure. The corner connector 200 includes a corner faceplate 204 which may be disposed upon an axis 202 aligned in the x direction of a conventional Cartesian x-y-z coordinate system.

In a non-limiting embodiment, the corner connector 200 includes: (1) the corner faceplate 204 attached to a corner leg 210 at an acute angle; and (2) a flange 236 that commences at the corner faceplate 204 and extends perpendicularly out in both directions from the corner leg 210. The flange 236 may further extend past the terminal end 238 of the corner leg 210.

Face Plate

Figure 3A:
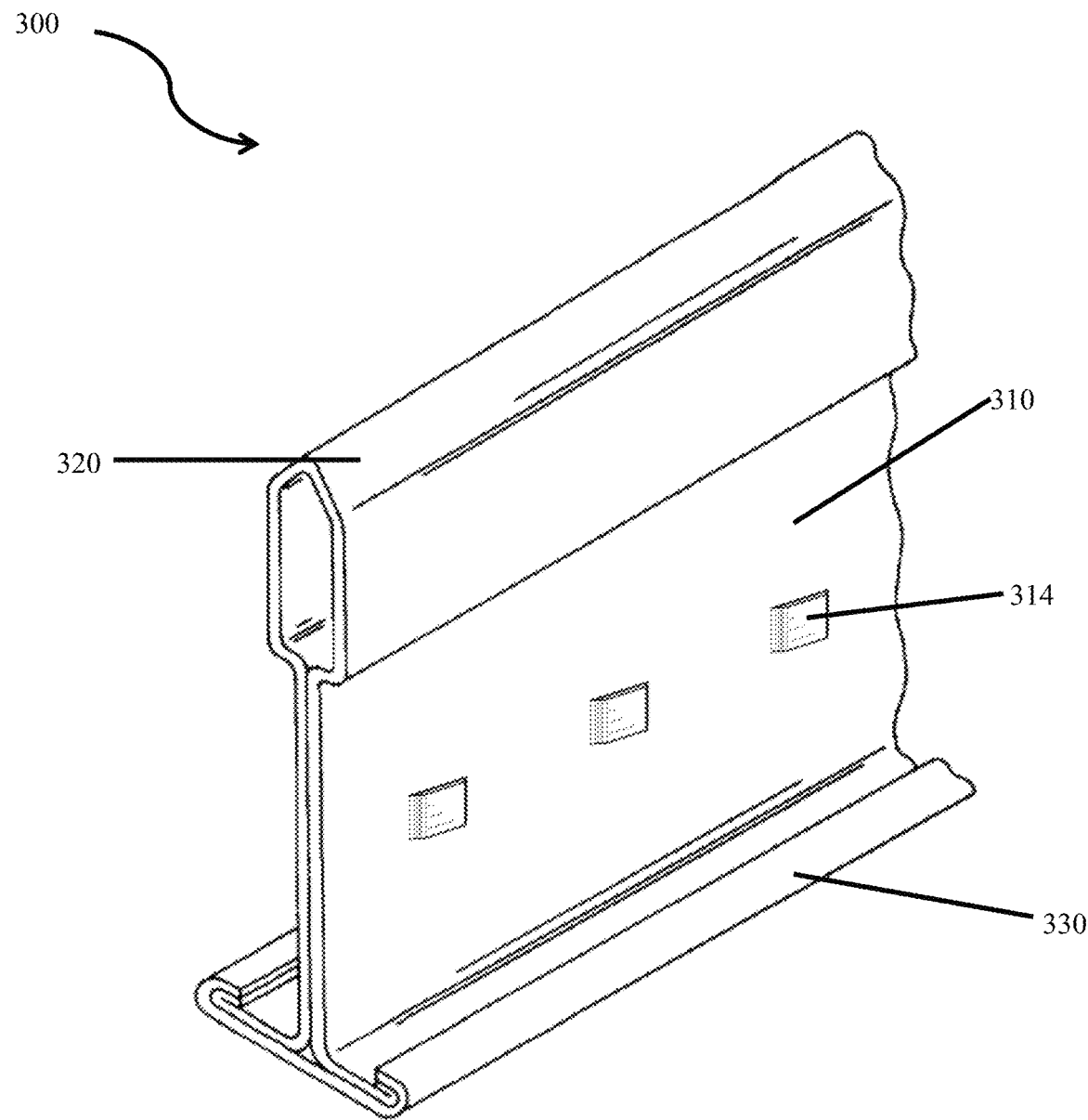
FIG. 3A is a perspective view of a ceiling beam

The angle connector 100 has the faceplate 104 which includes an inner surface 115 and an outer surface 117. The inner surface 115 is closer to both the first leg 110 and the second leg 112 than is the outer surface 117. The outer surface 117 may contact a beam 300 which, as illustrated in FIG. 3A, has a web 310, a bulb 320 at the top of the web 310, and a horizontal flange 330 extending from the bottom of the web 310. In one embodiment, the outer surface 117 of the faceplate 104 contacts the web 310 of the beam 300.

A faceplate aperture 128 may pass through the faceplate 104 from the inner surface 115 to the outer surface 117. In one embodiment, the faceplate aperture 128 is sized to accept a fastener which may pass from the web 310 of the beam 300 through the faceplate aperture 128. The fastener may secure the angle connector 100 to the beam 300. The faceplate aperture 128 may be substantially centered between the first arm 106 and a second arm 108. The faceplate aperture 128 may also be substantially centered between the top and bottom of the angle faceplate 104. In another embodiment, there may be two or more faceplate apertures 128 in the angle faceplate 104. Such faceplate apertures 128 may be vertically aligned, which when coupled with fasteners, may provide rotational stability around the axis 102. In a further embodiment, the faceplate aperture 128 may be threaded.

Figure 1B:
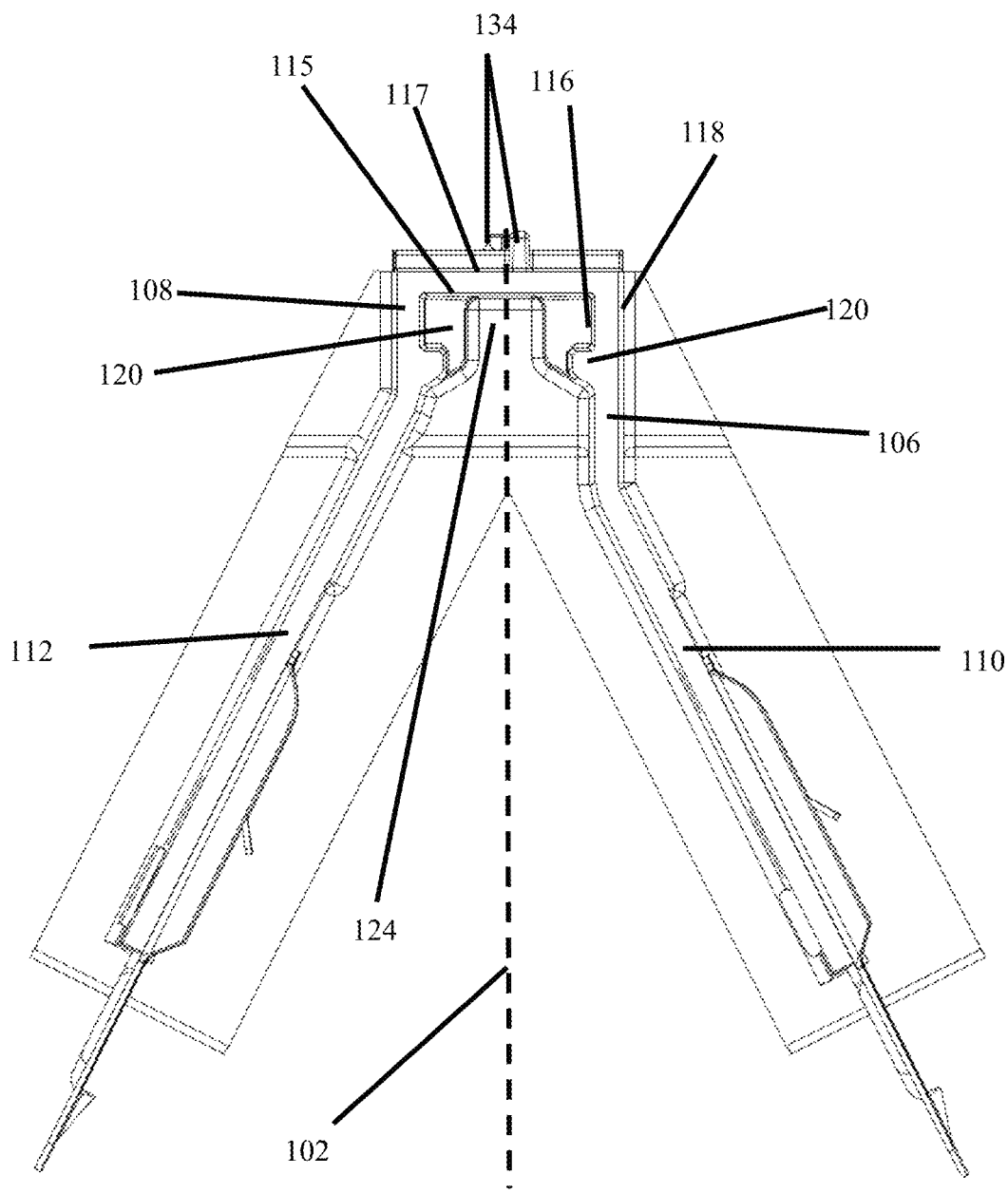
FIG. 1B is a top view of the angle connector shown in FIG. 1A.
Figure 1B:
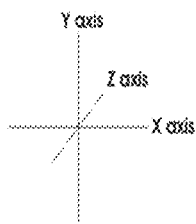

A locating protuberance 134 may extend outward from the outer surface 117 of the faceplate 104. In one embodiment, the locating protuberance 134 may be designed to engage with a slot 312 in the web 310 of the beam 300. Such an engagement with the slot 312 in the web 310 may minimize rotation around the axis 102, thereby increasing rotational stability for the angled connector 100. The locating protuberance 134 may have at least one side that is substantially flat, or it may have at least two sides that are substantially flat. In another embodiment, there may be two or more locating protuberances 134 extending outward from the outer surface 117 of the angle faceplate 104. The locating protuberances 134 may be vertically aligned. Conversely, the locating protuberances 134 may be offset as depicted in FIG. 1B.

Figure 1C:
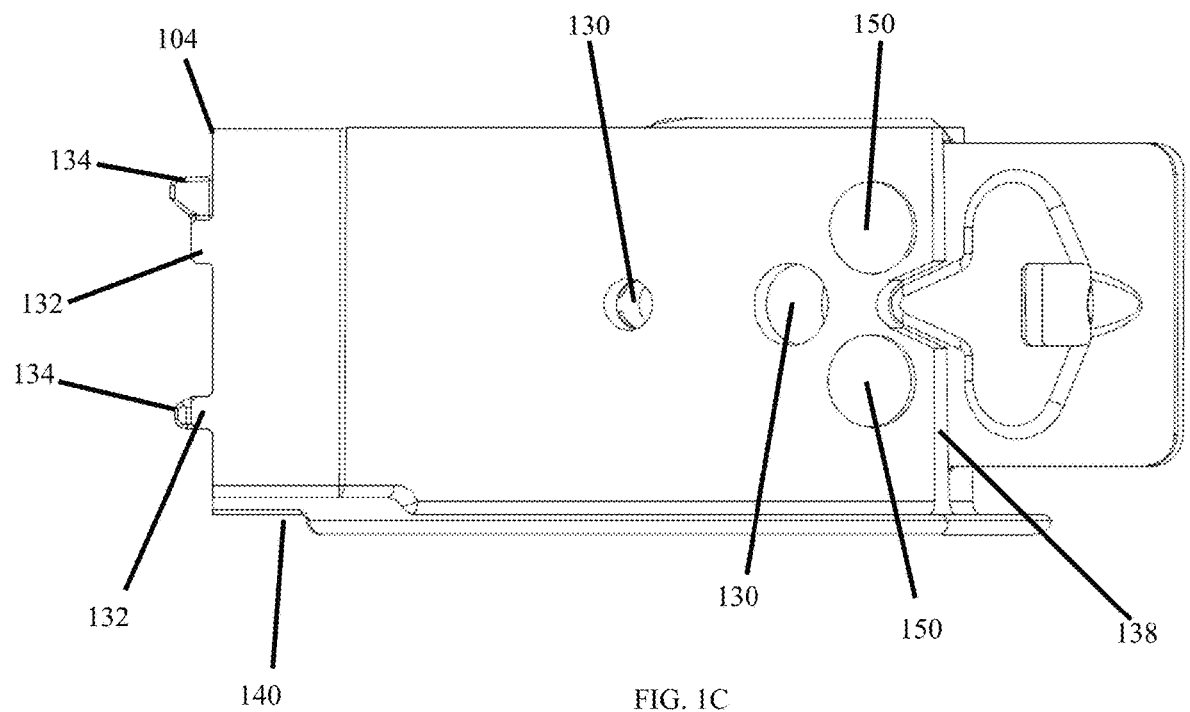
FIG. 1C is a side view of the angle connector shown in FIGS. 1A and 1B.

A spacing protuberance 132 may extend outward from the outer surface 117. The spacing protuberance 132 may contact the web 310 and provide spacing to prevent the faceplate 104 from contacting a stitch 314 of the beam 310. The spacing protuberance 132 may extend from one edge of the faceplate 104 to the opposite edge of the faceplate 104. The spacing protuberance 132 may take on many shapes, for example triangular, rectangular, square, rhombus, L-shaped, V-shaped, H-shaped, circular, or a combination thereof. The locating protuberance 134 may be connected to the spacing protuberance 132. In one embodiment, at least one locating protuberance 134 extends out from the spacing protuberance 132 as depicted in FIG. 1F. In another embodiment the faceplate 104 includes two or more spacing protuberances 132, which may run parallel to each other. In a non-limiting embodiment, the spacing protuberance 132 may contact the flange 136 and extend outward past the angle faceplate 104.

Figure 2F:
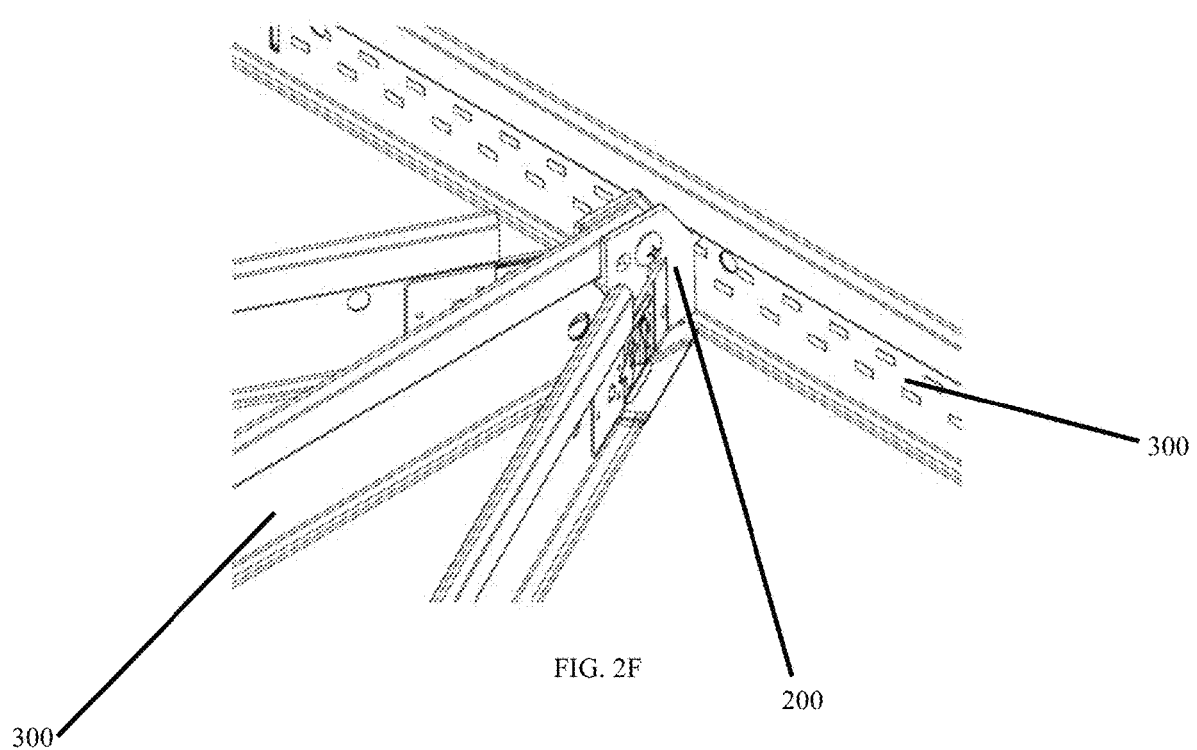
FIG. 2F is a perspective view of two of the corner connectors shown in FIGS. 2A, 2B, 2C, 2D, and 2E connected to beams.

The corner connector 200 has the corner faceplate 204 which includes an inner surface 216 and an outer surface 218. The inner surface 216 is both closer to the corner leg 210 than to the outer surface 218, and closer to the first leg 210 than is the outer surface 218. The outer surface 218 may contact the beam 300 having the web 310, the bulb 320 at the top of the web 310, and the horizontal flange 330 extending from the bottom of the web 310. In one embodiment, the outer surface 218 of the corner connector 200 contacts the web 310 of the beam 300 and a substantially perpendicular edge of the corner connector 200 contacts the web 310 of a second beam 300 as depicted in FIG. 2F.

A corner aperture 228 may pass through the corner faceplate 204 from the inner surface 216 to the outer surface 218. In one embodiment, the corner aperture 228 is sized to accept a fastener which may connect the bulb 320 and the corner connector 200 through the corner aperture 228 as depicted in FIG. 2F. The corner aperture 228 may be closer to the top of the corner connector 200 than the bottom as depicted in FIG. 2F. The corner aperture 228 may also be substantially centered between the two opposite edges of the faceplate 204. In another embodiment, there may be two or more corner apertures 228 in the corner faceplate 204. Such corner apertures 228 may be horizontally aligned, which may permit corner connectors 200 on opposite sides of the bulb 310 to be connected with fasteners as depicted in FIG. 2F. In a further embodiment, the corner aperture 228 may be threaded.

A spacing protuberance 232 may extend outward from the outer surface 218. The spacing protuberance 232 may contact the web 310 and provide spacing to prevent the corner faceplate 204 from contacting the stitch 314 of the beam 310. In another non-limiting embodiment, there are two or more spacing protuberances 232, wherein an upper spacing protuberance 232 may locate the corner connector vertically (preventing upward movement). The spacing protuberance 232 may also provide for rotation stability around the aperture 228 (about axis 202) as it contacts the underside of the beam bulb 320. The lower spacing protuberance 232 may be designed to interface with a beam end (both clip side and non-clip side) to locate the clip in the direction perpendicular to the corner faceplate 204.

The spacing protuberance 232 may extend from one edge of the corner faceplate 204 to the opposite edge of the corner faceplate 204. In another embodiment, as depicted in FIG. 2B, the spacing protuberance 232 may wrap around one edge of the corner faceplate 204 and extend out from the edge of the corner faceplate 204. Such an extension from the edge of the corner faceplate 204 may provide spacing to prevent the corner faceplate 204 from contacting the stitch 314 of either of the two beams 310 that connect to each other to form a corner. The spacing protuberances 232 may take on many shapes, for example triangular, rectangular, square, rhombus, L-shaped, V-shaped, H-shaped, circular, or a combination thereof. In one embodiment the corner faceplate 204 includes two or more spacing protuberances 232, which may run parallel to each other. In a non-limiting embodiment, the spacing protuberance 232 may contact the flange 236 and extend outward past the corner faceplate 204.

Both the corner spacing protuberance 232 and the angle spacing protuberance 132 may include variable heights or widths which may create a spacing notch 234. An example of one embodiment of a spacing notch 234 is depicted in FIG. 2A.

Arms

The angle connector 100 has the first arm 106 and the second arm 108 connected to the angle faceplate 104, forming the channel 124. The first arm 106 or the second arm 108 may be connected at opposites edges of the angle faceplate 104. Conversely, the first arm 106 or the second arm 108 may be connected to the inner surface 115 of the angle faceplate 104.

Each arm 106, 108 has an interior surface 116 and an exterior surface 118. The interior surfaces 116 are closer to the opposing arm than are the exterior surfaces 118.

The first arm 106 and second arm 108 may be of equal length. Conversely, the arms 106, 108 may be unequal lengths. For example, as depicted in FIG. 1B, the first arm 106 may be longer than the second arm 108. Conversely, the second arm 108 may be longer than the first arm 106.

A channel protuberance 120 may project outward from the interior surface 116 of either the first arm 106 or the second arm 108. In one embodiment, the channel protuberance 120 may have at least one substantially flat surface. In one embodiment, the channel protuberance 120 is a distance from the angle faceplate 104 which permits a portion of a fastener component to pass between the protuberance 120 and the faceplate 104. The channel protuberance 120 may stop a fastener component from moving along the axis. 102.

Figure 1D:
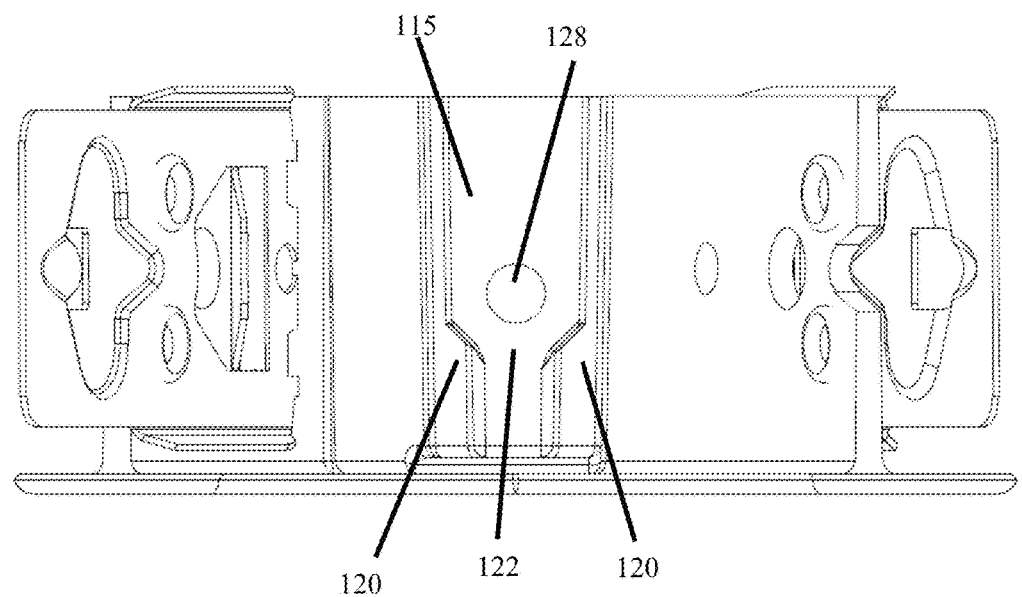
FIG. 1D is a rear view of the angle connector shown in FIGS. 1A, 1B, and 1C.

In one embodiment, as depicted in FIG. 1D, the distance that the channel protuberance 120 projects from the interior surface 116 may vary between the top and the bottom of the first arm 106 or the second arm 108.

Figure 1E:
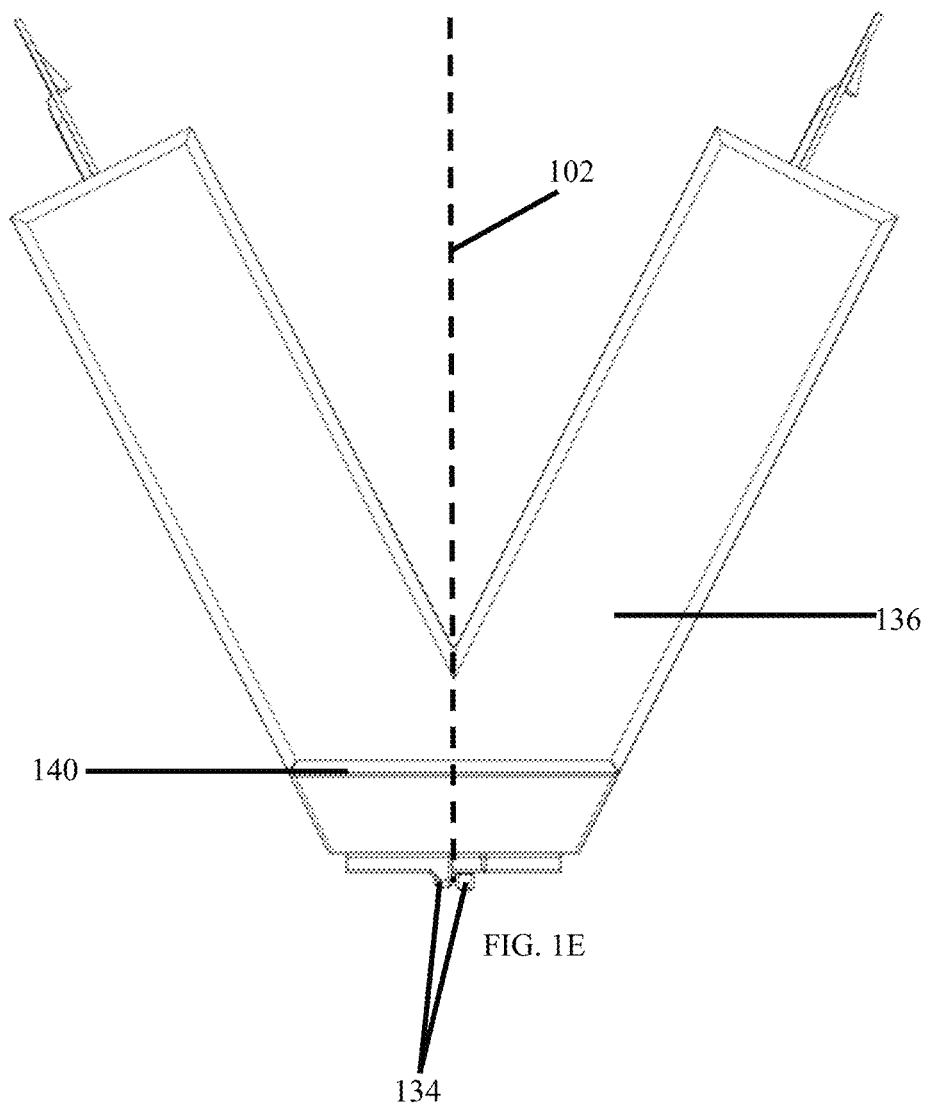
FIG. 1E is a bottom view of the angle connector shown in FIGS. 1A, 1B, 1C, and 1D.
Figure 1F:
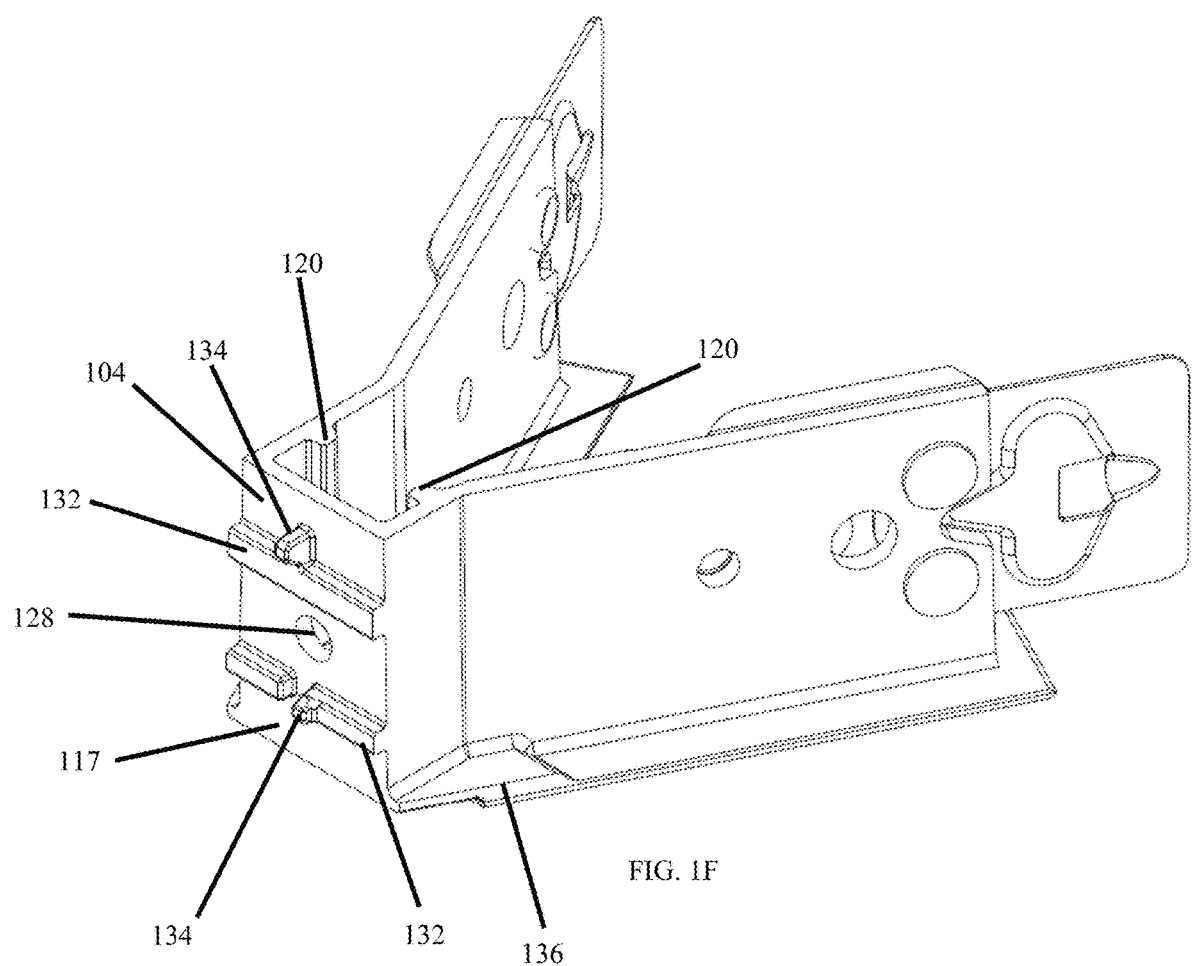
FIG. 1F is a perspective view of one embodiment of the outer surface of an angle face plate.
Figure 1G:
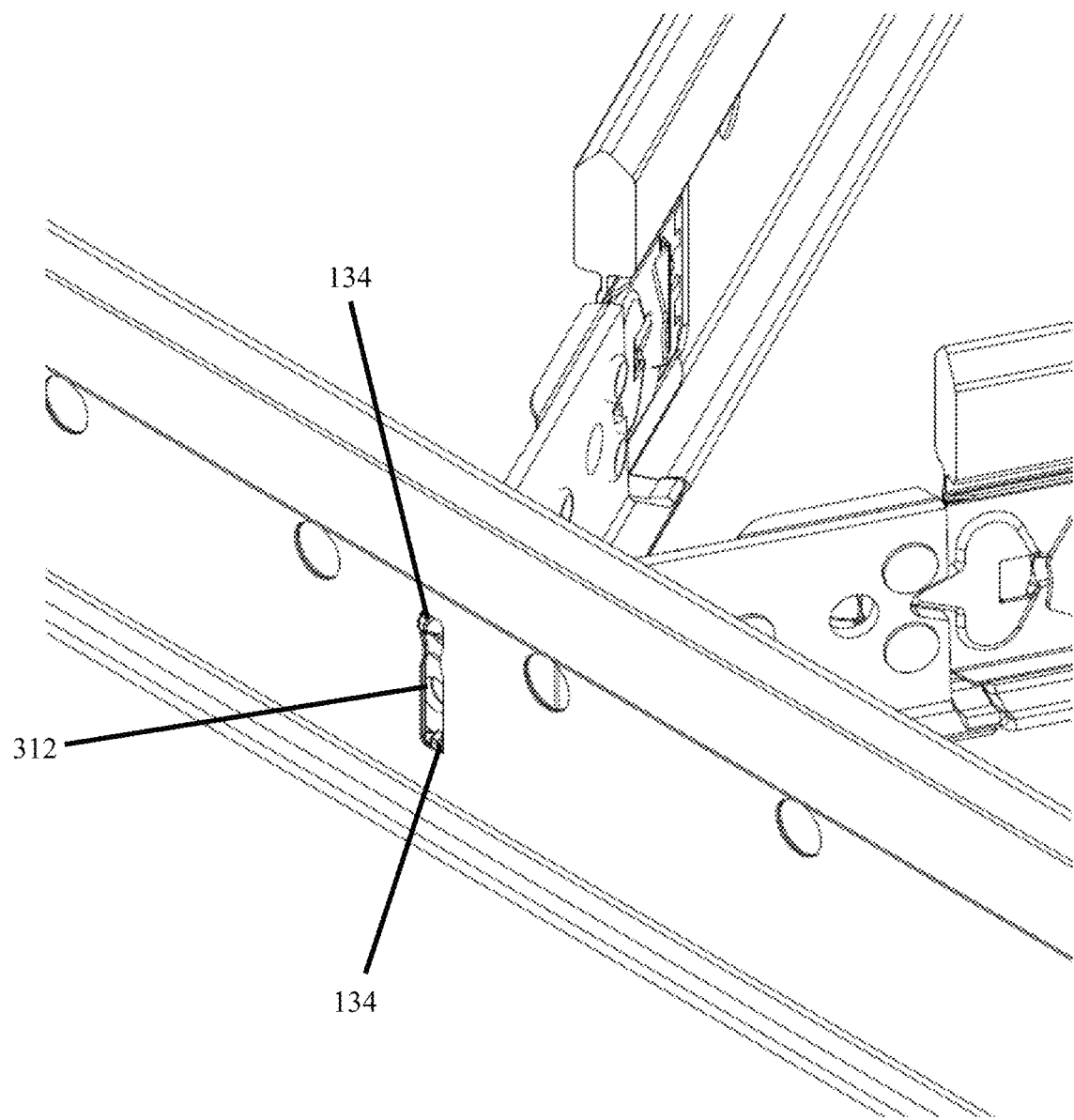
FIG. 1G is a perspective view of the outer surface of the angle face plate shown in FIG. 1F contacting a beam.
Figure 1H:
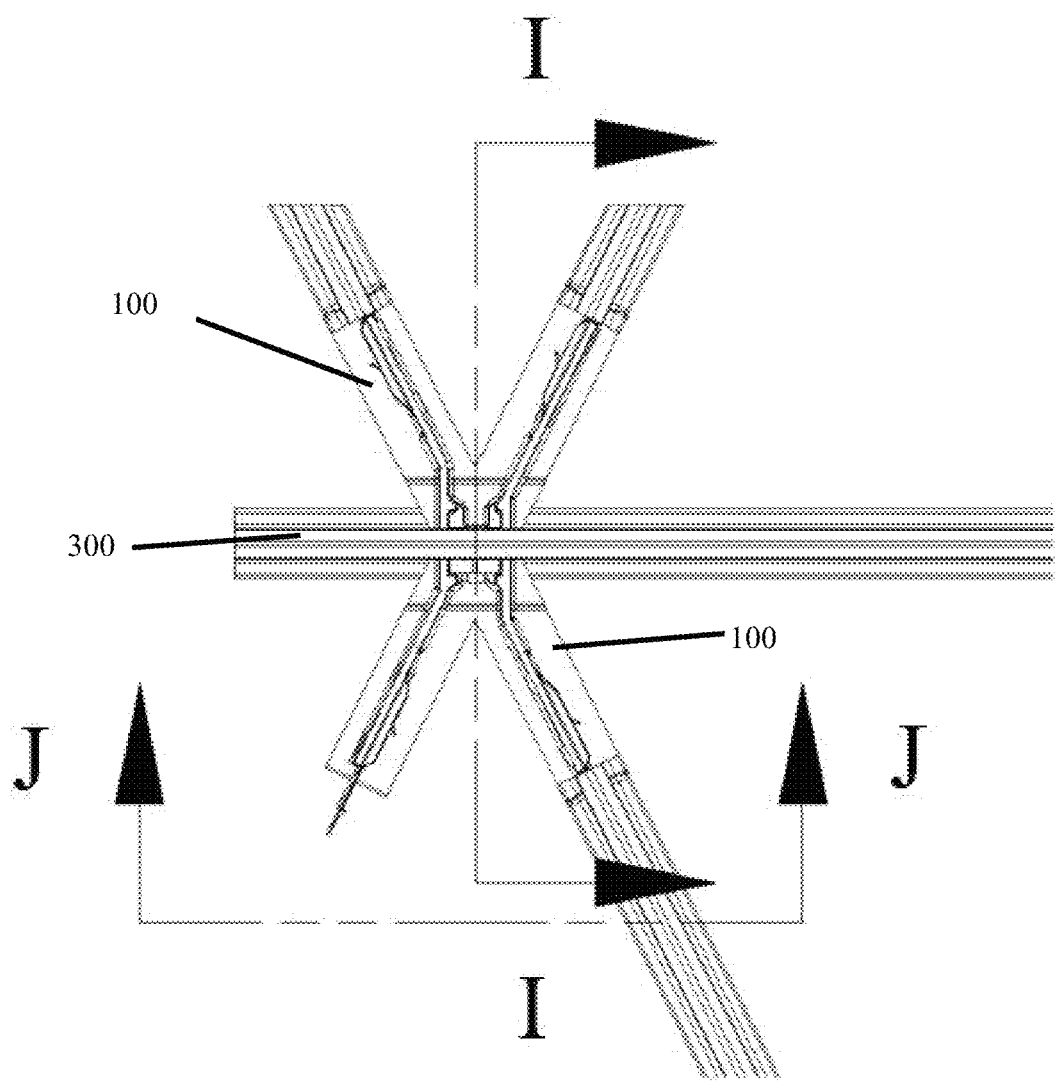
FIG. 1H is a top view of two of the angle connectors shown in FIGS. 1A, 1B, 1C, 1D and 1E connected to beams.
Figure 1I:
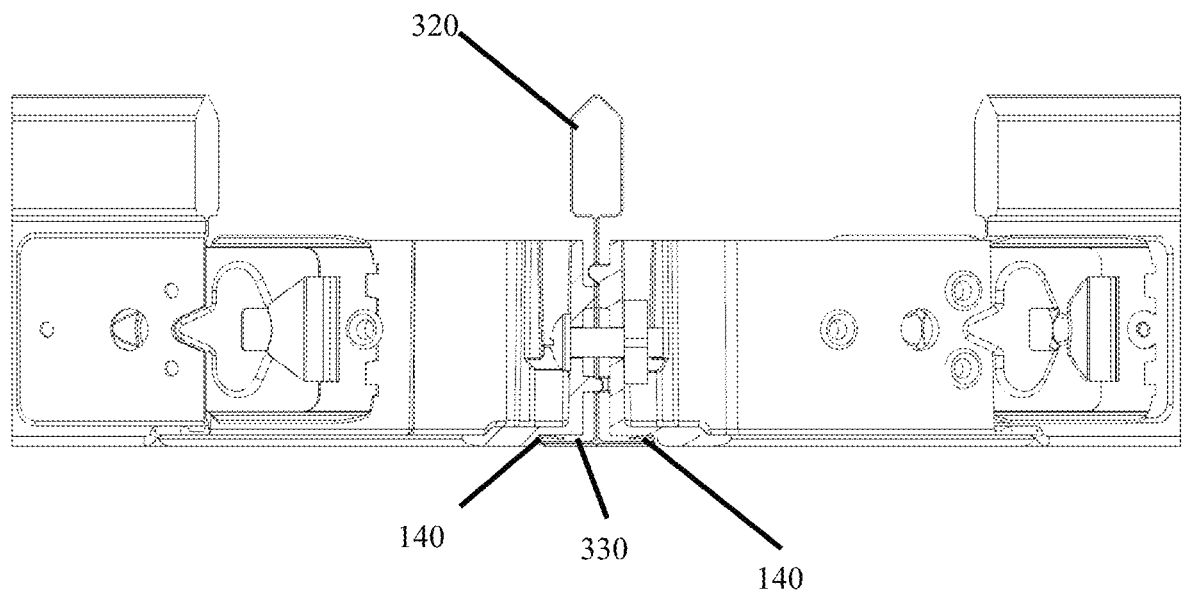
FIG. 1I is a side sectional view taken on the line I-I of FIG. 1H.
Figure 1J:
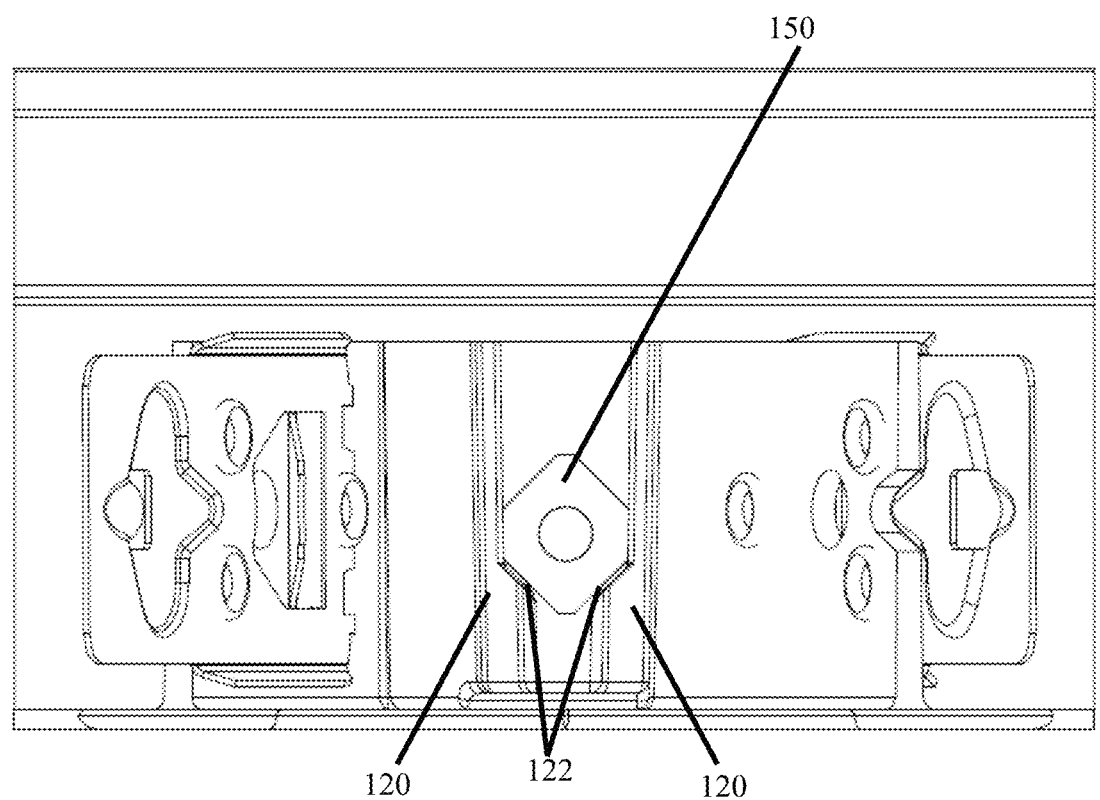
FIG. 1J is a rear sectional view taken on the line J-J of FIG. 1H.
Figure 1K:
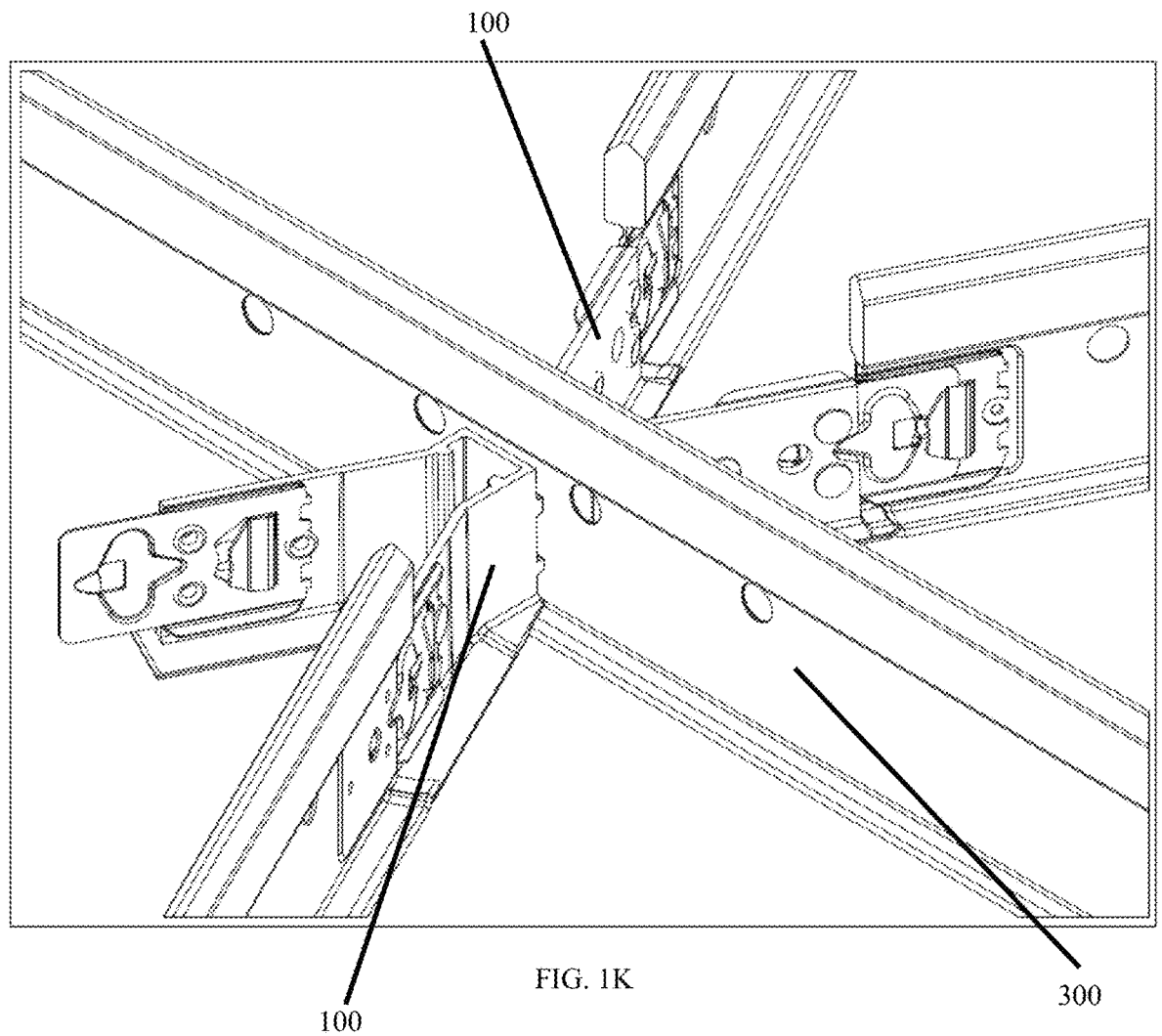
FIG. 1K is a perspective view of two of the angle connectors shown in FIGS. 1A, 1B, 1C, 1D, and 1E connected to beams.

In another embodiment, as depicted in FIG. 1B, the channel protuberance 120 may contact the inner surface 115 of the angle faceplate 104. Such contact between the channel protuberance 120 and the inner surface 115 of the angle faceplate 104 may define a fastener landing 122. In one embodiment, the fastener landing 122 may include one, two, three, or four substantially flat surface's which may contact fastener elements (e.g., nuts). As depicted in FIG. 1J, the fastener landing 122 may have two substantially flat surfaces which may engage with a four-sided fastener component 150 (e.g., a nut). In one embodiment, the interior surfaces 116 of the first arm 106 or the second arm 108 or the fastener landing 122 may restrict the rotation of the fastener component 150 about the axis 102.

Such a hands-free alignment and hold on the fastener component 150 may simplify the installation of the described grid. For example, an installer may simply drop a nut into the channel 124. The channel protuberance 120 may restrict the movement of the fastener component 150 along the axis 102. Furthermore, the interior surfaces 116 of the first arm 106 or the second arm 108 or the fastener landing 122 may restrict the rotating of the fastener component 150 about the axis 102. As a result, the installer may pass a bolt through the web 310 of the beam 300 and the faceplate aperture 128 and connect it with the nut that is held in place by the fastener landing 122 or the channel protuberance 120, without the need to touch the nut.

Legs

The angle connector 100 has the first leg 110. The first leg 110 projects away from the angle faceplate 104 at an acute angle from the angle axis 102. The first leg 110 has the terminal end 138 opposite the first arm 106. The first leg 110 is attached to the first arm 106 at the edge opposite the angle faceplate 104. The angle connector 100 may have the second leg 112 attached to the second arm 108 at the edge opposite the angle faceplate 104. The second leg 112 projects outward from the angle faceplate 104 at an acute angle from the axis 102. To maintain standard beam lengths and rout spacing at 2 foot, 3 foot, or 4 foot (61 cm, 91 cm, or 122 cm) beam-spacing, the second leg 112 may project out at the following angles measured from the axis 102: about 14.0°, about 18.4°, about 26.6°, about 30.3°, about 45.0°, about 59.7°, about 63.4°, about 71.6°, or about 76.0°. In another non-limiting embodiment, for beams having custom slot locations, the second leg 112 may project out at the following angles measured from the axis 102: about 15.0°, about 30.0°, about 45.0°, about 60.0°, or about 75.0°.

The corner connector 200 has the corner leg 210. The corner leg 210 projects away from the corner faceplate 204 at an acute angle from the corner axis 202. The corner leg 210 has the terminal end 238 opposite the corner faceplate 204. The corner leg 210 is attached to and projects out from the inner surface 216 of the corner faceplate 204. To maintain standard beam lengths and rout spacing at 2 foot, 3 foot, or 4 foot (61 cm, 91 cm, or 122 cm) beam spacing, the corner leg 210 may project out at the following angles measured from the axis 202: about 14.0°, about 18.4°, about 26.6°, about 30.3°, about 45.0°, about 59.7°, about 63.4°, about 71.6°, or about 76.0°. In another non-limiting embodiment, for beams having custom slot locations, the corner leg 210 may project out at the following angles measured from the axis 102: about 15.0°, about 30.0°, about 45.0°, about 60.0°, or about 75.0°.

The first leg 110, the second leg 112, and the corner leg 210 all contain at least one leg aperture 130. In one exemplary embodiment, as depicted in FIG. 2A, the first leg 110, the second leg 112, or the corner leg 210 includes three or more leg apertures 130, wherein two leg apertures 130 may be vertically aligned close to the terminal end 138, 238 and a third aperture 130, forming a triangle with the first two apertures 130, may be farther from the terminal end 138, 238 than the first two apertures 130. Indeed, the first leg 110, the second leg 112, or the corner leg 210 may further include a fourth leg aperture 130 that is substantially centered between two ends of the first leg 110, the second leg 112, or the corner leg 210.

The first leg 110, the second leg 112, or the corner leg 210 may contain at least one leg notch 114. In one embodiment, the notch 114 is V-shaped and may be centered on the terminal end 138, 238 of the angle faceplate 104 or corner faceplate 204 as depicted in FIG. 1C.

Flange

The bottom of the angle connector 100 includes the flange 136 that commences at the faceplate 104 and extends substantially perpendicularly out in both directions from the first arm 106, the second arm 108, and the first leg 110. In one embodiment, the flange 136 may extend past the terminal end 138 of the first leg 110. In another embodiment, the flange 136 further extends substantially perpendicularly out in both directions from the second leg 112 and may further extend past the terminal end 138 of the second leg 112.

The bottom of the corner connector 200 includes the flange 236 that commences at the corner faceplate 204 and extends substantially perpendicularly out in both directions from the corner leg 210. The flange 236 may further extend past the terminal end 238 of the corner leg 210.

Figure 3B:
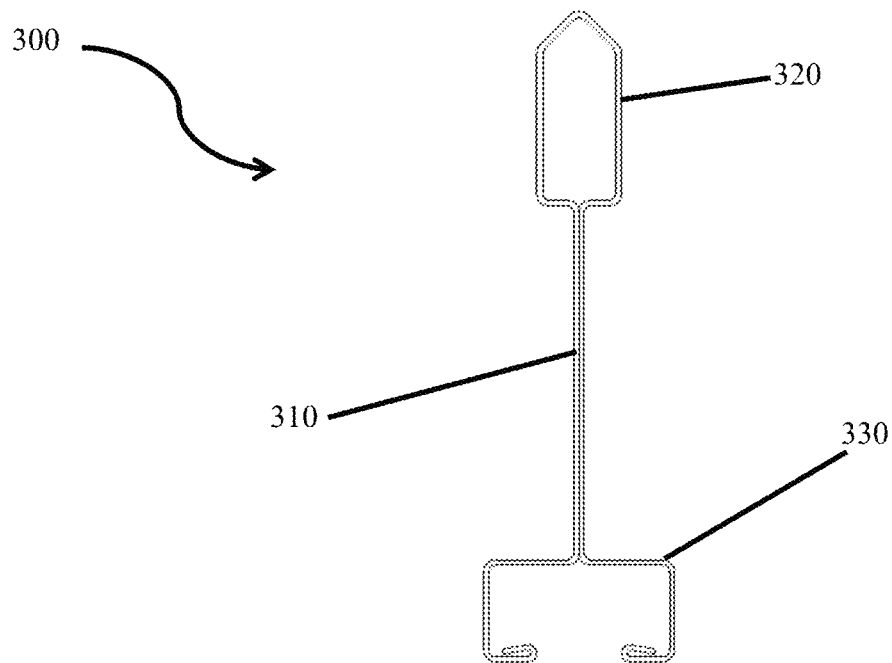
FIG. 3B is a cross sectional view of a ceiling beam with a slotted flange.
Figure 3C:
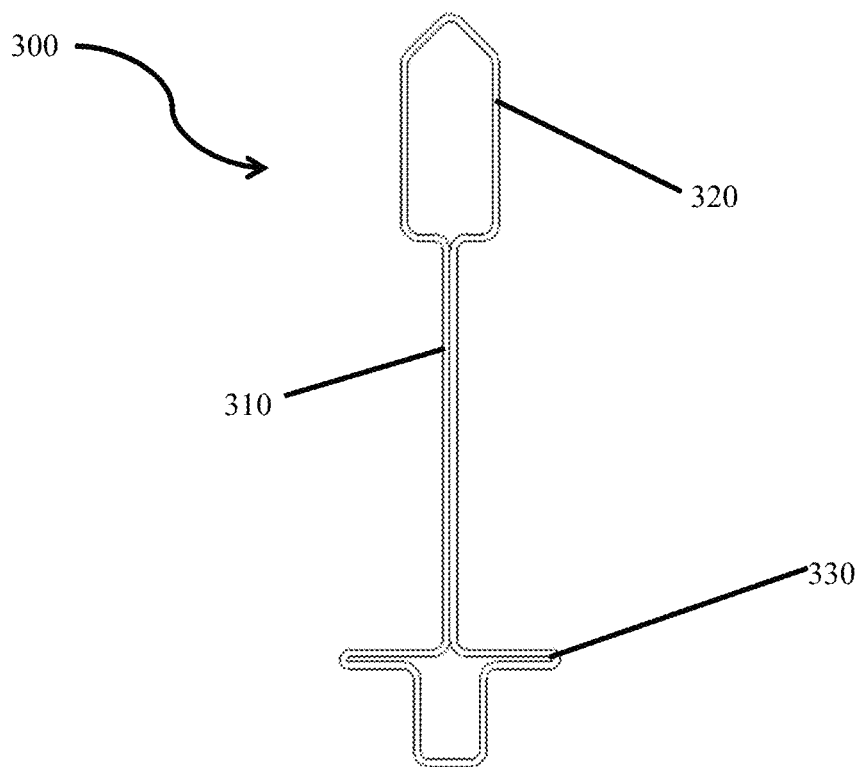
FIG. 3C is a cross sectional view of a ceiling beam with a dimensional flange.
Figure 3D:
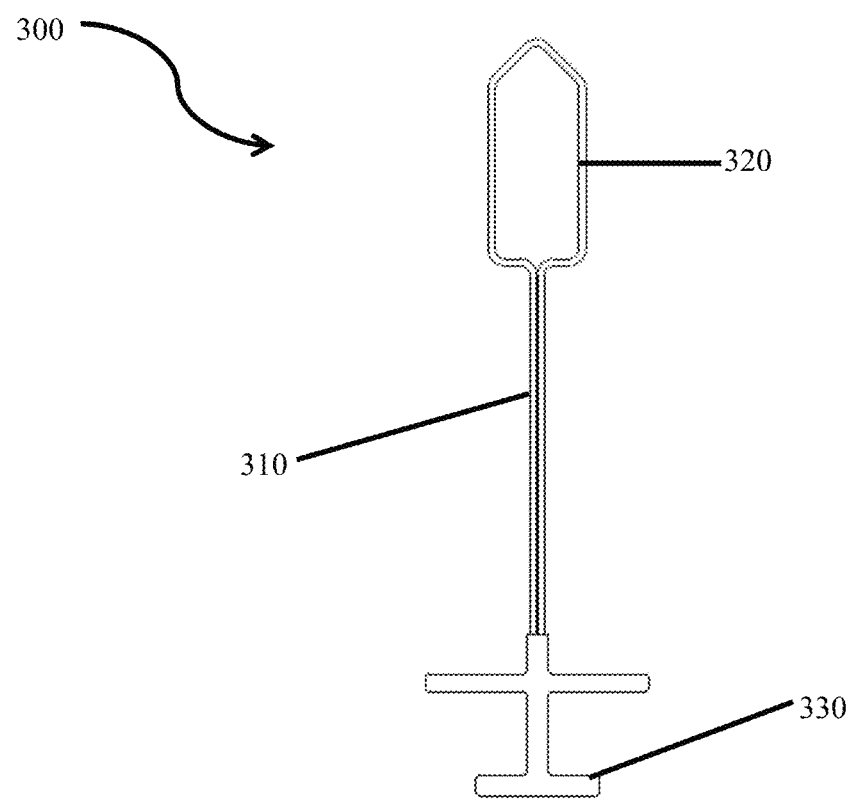
FIG. 3D is a cross sectional view of a ceiling beam with a dimensional flange.

The flange 136 may have many shapes. For example, the flange 136 may be V-shaped as depicted in FIG. 1E. In another embodiment, a portion of the flange 136 extending from the first leg 110 may contact a portion of the flange 136 extending from the second leg 112 to form a triangular-shaped flange 136. In a still further embodiment, the top and bottom of the flange 136 may be connected by a straight or curved element. In another non-limiting embodiment, the flange 136 may include a face to match the associated grid type (e.g., slotted, textured, or dimensional). One embodiment of a beam 300 for forming grids with slotted flanges 330 is depicted in FIG. 3B. Two embodiments of beams 300 for forming grids with dimensional flanges 330 are depicted in FIGS. 3C and 3D. In some embodiments the flange 136 may take on such shapes. The bottom of the flange 136 may also be textured.

The flange 236 may also take on many shapes. For example, the flange 236 may be trapezoidal as depicted in FIG. 2B. In a further embodiment, the top and bottom of the flange 236 may be connected by a straight or curved element. In another non-limiting embodiment, the flange 236 may include a face to match the associated grid type (e.g., slotted, textured, or dimensional). In some embodiments the flange 236 may have a slotted or dimensional shape. The bottom of the flange 236 may also be textured.

The flange 136, 236 may include a step 140 resulting in a portion of the flange 136, 236 closest to the angle faceplate 104 or the corner faceplate 204 residing in a first plane and the remaining portion of the flange 136, 236 residing in a second plane. In one embodiment, the height and length of the step 140 may be about the same as the height and length of the beam flange 330. In such a design, the section of the flange 136, 236 comprising the step 140 may rest on the top of the beam flange 330 with the unsupported portion of the flange 136, 236 residing in substantially the same plane as the beam flange 330.

Ceiling System

The legs 110, 112, 210 may be connected to the beam 300 to form a grid. In one embodiment, splice plates may be used to connect the legs 110, 112, 210 to the beam 300.

The splice plate may be roughly rectangular and may be formed by stamping a metal such as steel. The splice plate may have a thickness of 0.0150 inches (0.38 cm), with a generally rectangular dimension of ⅞ inches by 1½ inches (2.22 cm by 3.81 cm). The splice plate may have two or more splice apertures which may accept fasteners. The splice apertures may be on opposite ends of the splice plate. The ceiling grid system may then be formed by connecting the angle connector 100 or corner connector 200 to beams 300 using a splice plate and fasteners.

Materials Used in Manufacture

The angle connector 100 and corner connector 200 may be constructed of materials known to those skilled in the art (e.g., metal, carbon fiber, plastic, wood, or composite materials). In one embodiment, the angle connector 100 or corner connector is 200 is made of die cast aluminum.

EXAMPLES

Figure 4A:
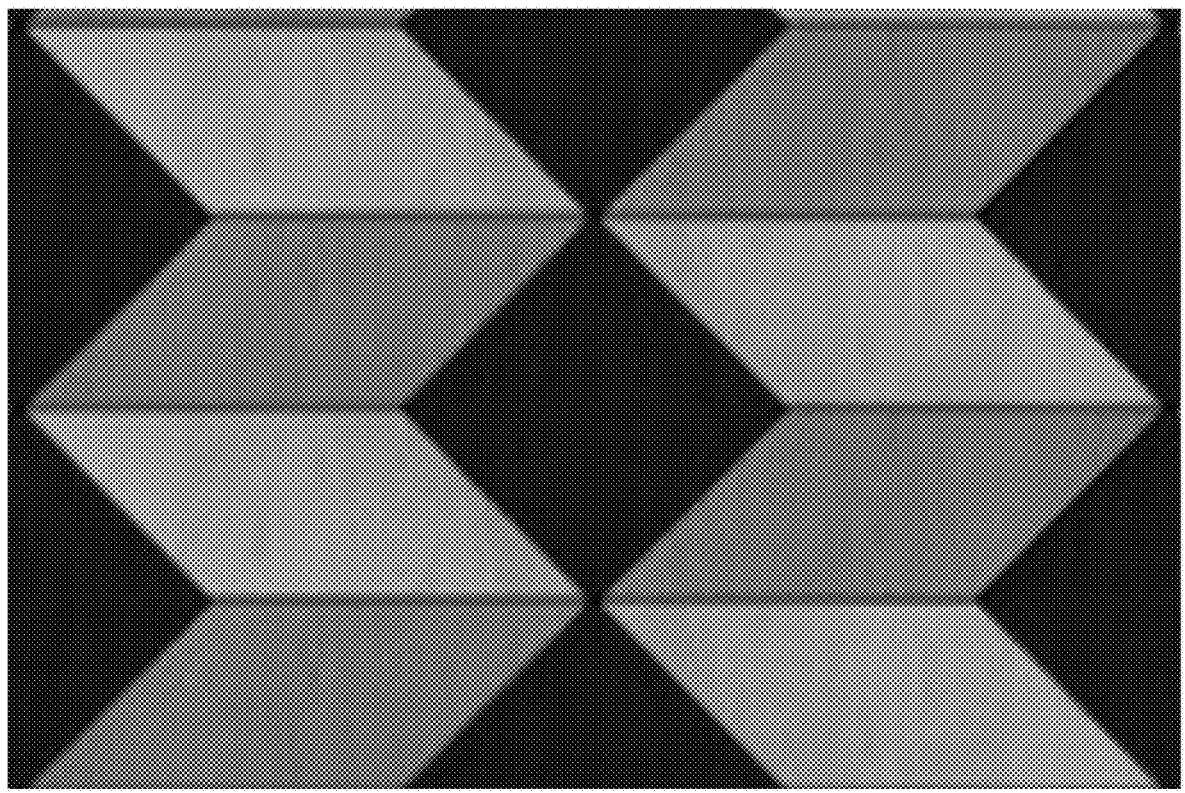
FIG. 4A is picture of a first ceiling design that may be crafted using the angle and corner connectors disclosed.
Figure 4B:
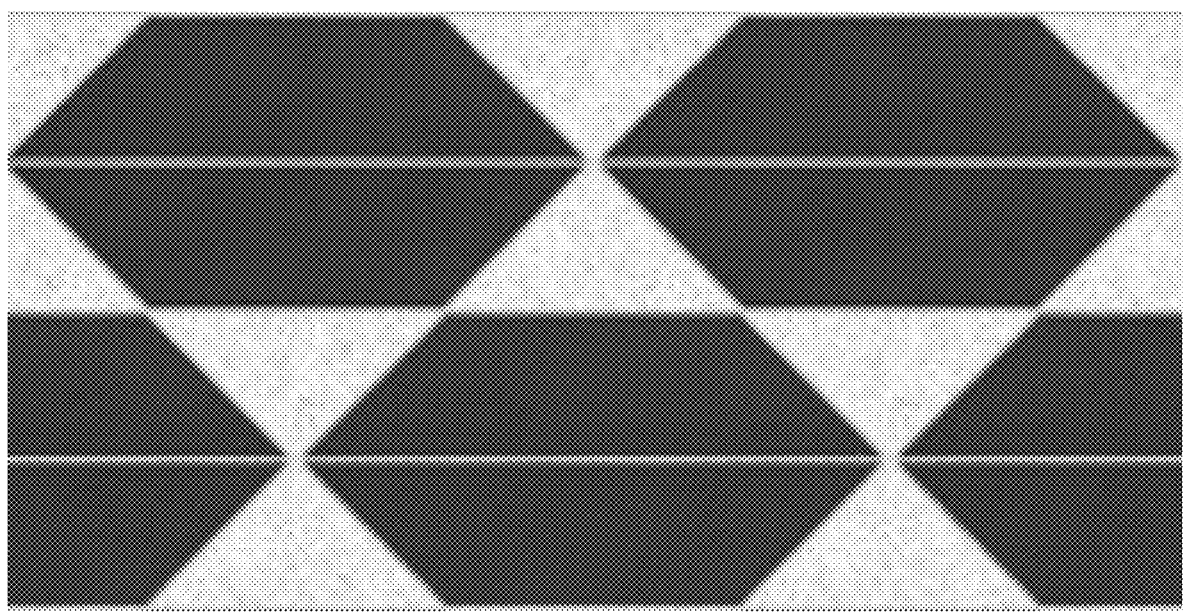
FIG. 4B is picture of a second ceiling design that may be crafted using the angle and corner connectors disclosed.
Figure 4C:
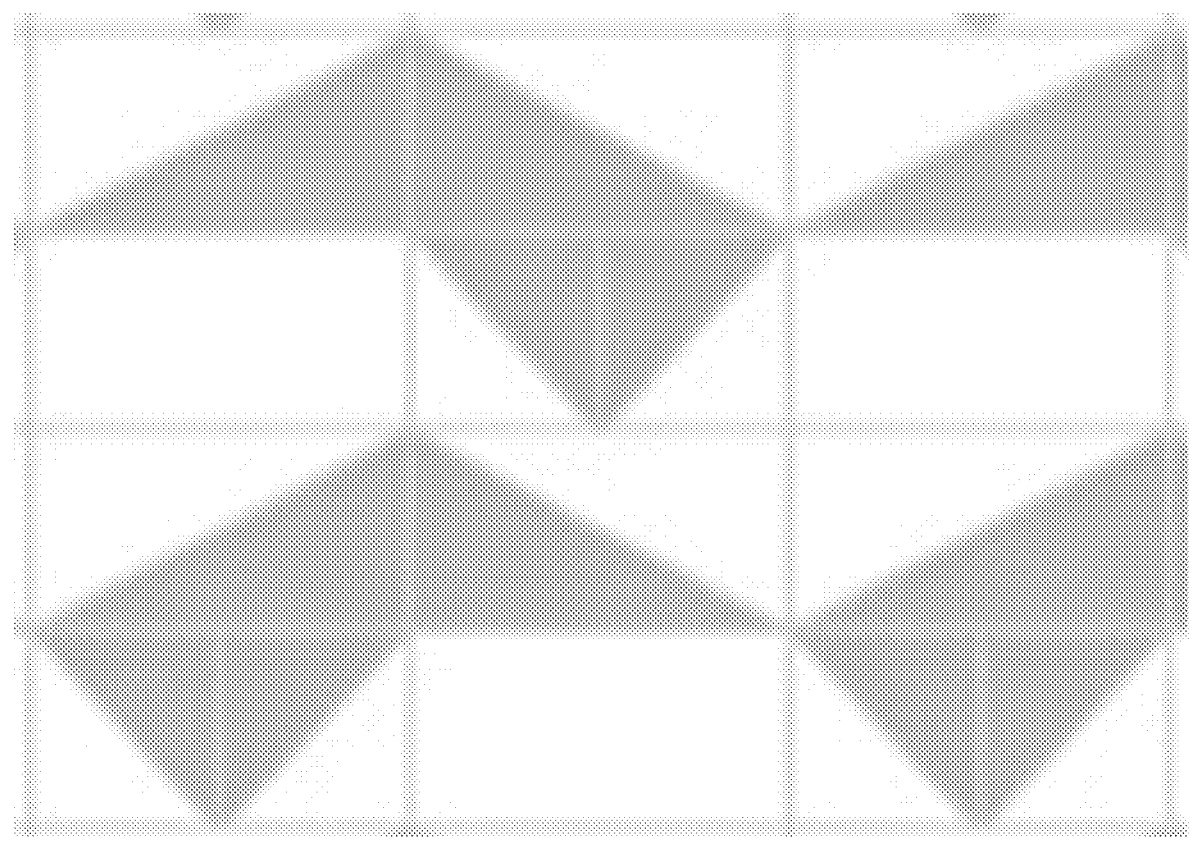
FIG. 4C is picture of a third ceiling design that may be crafted using the angle and corner connectors disclosed.

The following examples are included to more clearly demonstrate the overall nature of the invention. FIGS. 4A, 4B, and 4C illustrate embodiments of the visually appealing designs of suspended ceilings that may be created using the disclosed connectors. These examples are exemplary, not restrictive, of the invention.

In the non-limiting embodiment, the grid system to create the designs in FIGS. 4A, 4B, and 4C employs angle connectors 100 and/or corner connectors 200.

In summary, the present invention provides installers with the option of moving past squares and rectangles to incorporate more ornamental designs into their ceiling grid designs.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed is:

1. A connector for a suspended ceiling, the connector comprising:
    a U-shaped body defining a channel, the body including
        a faceplate containing a plate aperture,
        a first arm having a top and a bottom,
        a second arm, and
        a first protuberance,
        wherein the faceplate connects the first arm and the second arm, and the first protuberance projects outward from an interior surface of the first arm;
    a first leg attached to the first arm at an edge opposite the faceplate, the first leg projecting outward at an acute angle from an axis substantially perpendicular to an inner surface of the faceplate, the first leg having at least one leg aperture and a terminal end opposite the first arm; and
    a flange commencing at the faceplate and extending substantially perpendicularly out, in opposite directions, from the first arm and the first leg.

2. The connector of claim 1 further comprising a second leg attached to the second arm at an edge opposite the faceplate, the second leg projecting outward at an acute angle from the axis and having at least one leg aperture and a terminal end opposite the second arm.

3. The connector of claim 1, further comprising a second protuberance projecting outward from an interior surface of the second arm.

4. The connector of claim 1, wherein the distance that the first protuberance projects from the interior surface of the first arm varies between the top and the bottom of the first arm.

5. The connector of claim 3, wherein a portion of the first protuberance or the second protuberance contacts the faceplate defining a landing with at least one substantially flat surface adapted to align a fastener component dropped into the channel through the plate aperture.

6. The connector of claim 1 further comprising a spacing protuberance projecting outward from an outer surface of the faceplate.

7. The connector of claim 6, wherein the spacing protuberance shape is triangular, rectangular, square, rhombus, L-shaped, V-shaped, H-shaped, circular, or a combination thereof.

8. The connector of claim 6 further comprising a locating protuberance projecting outward from the outer surface of the faceplate.

9. The connector of claim 8, wherein the locating protuberance contacts the spacing protuberance.

10. The connector of claim 8 further comprising at least two locating protuberances.

11. The connector of claim 10 wherein the two or more locating protuberances are vertically offset.

12. The connector of claim 1, wherein the acute angle is about 14.0 degrees, about 18.4 degrees, about 26.6 degrees, about 30.3 degrees, about 45.0 degrees, about 59.7 degrees, about 63.4 degrees, about 71.6 degrees, or about 76.0 degrees.

13. The connector of claim 1, wherein the flange extends past the terminal end.

14. The connector of claim 1, wherein the flange further includes a step.

15. A connector for a suspended ceiling, the connector comprising:
- a faceplate containing a plate aperture,
- a leg attached to the faceplate and projecting outward at an acute angle from an axis substantially perpendicular to a surface of the faceplate attached to the leg, the leg having at least one leg aperture and a terminal end opposite the faceplate;
- a spacing protuberance projecting outward from the surface of the faceplate opposite the leg and wrapping around at least one edge of the faceplate; and
- a flange commencing at the faceplate and extending substantially perpendicularly out, in opposite directions, from the leg.

16. The connector of claim 15, wherein the flange extends past the terminal end.

17. The connector of claim 15, wherein the acute angle is about 14.0 degrees, about 18.4 degrees, about 26.6 degrees, about 30.3 degrees, about 45.0 degrees, about 59.7 degrees, about 63.4 degrees, about 71.6 degrees, or about 76.0 degrees.

18. The connector of claim 15, wherein the flange further includes a step.

19. The connector of claim 15, further comprising at least three leg apertures wherein two of the leg apertures are vertically aligned close to the terminal end and a third aperture, forming a triangle with the two of the leg apertures, is farther from the terminal end than the first two apertures.

20. A suspended ceiling comprising:
- a beam attached to either:
  - an angle connector having:
    - a U-shaped body defining a channel, the body including a faceplate containing a plate aperture, the faceplate connecting a first arm and a second arm, a first protuberance projecting outward from an interior surface of the first arm,
    - a first leg attached to the first arm at an edge opposite the faceplate, the first leg projecting outward at an acute angle from an axis substantially perpendicular to an inner surface of the faceplate, the first leg having at least one leg aperture and a terminal end opposite the first arm, and
    - a flange commencing at the faceplate and extending substantially perpendicularly out, in opposite directions, from the first arm and the first leg; or
  - a corner connector having:
    - a faceplate containing a plate aperture,
    - a leg attached to the faceplate and projecting outward at an acute angle from an axis substantially perpendicular to a sure of the faceplate attached to the leg, the leg having at least one leg aperture and a terminal end opposite the faceplate,
    - a spacing protuberance projecting outward from the surface of the faceplate opposite the leg and wrapping around at least one edge of the faceplate, and
    - a flange commencing at the faceplate and extending substantially perpendicularly out, in opposite directions, from the leg.

* * * * *